US012563496B2

(12) United States Patent
Min et al.

(10) Patent No.: US 12,563,496 B2
(45) Date of Patent: Feb. 24, 2026

(54) ELECTRONIC DEVICE AND OPERATION METHOD THEREOF FOR SETTING TARGET WAKE TIME PARAMETERS BASED ON RESPONSE SIGNAL RECEIVED FROM EXTERNAL ELECTRONIC DEVICE OF DIFFERENT BASIC SERVICE SET

(71) Applicant: SAMSUNG ELECTRONICS CO., LTD., Suwon-si (KR)

(72) Inventors: Hyunkee Min, Suwon-si (KR); Sunghwan Kim, Suwon-si (KR); Junhak Lim, Suwon-si (KR); Kiyeong Jeong, Suwon-si (KR); Junsu Choi, Suwon-si (KR); Hyeonu Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 382 days.

(21) Appl. No.: 17/968,328

(22) Filed: Oct. 18, 2022

(65) Prior Publication Data

US 2023/0112940 A1    Apr. 13, 2023

Related U.S. Application Data

(63) Continuation of application No. PCT/KR2022/014823, filed on Sep. 30, 2022.

(30) Foreign Application Priority Data

Oct. 8, 2021    (KR) ........................ 10-2021-0134016
Nov. 16, 2021    (KR) ........................ 10-2021-0157594

(51) Int. Cl.
*H04W 52/02*    (2009.01)

(52) U.S. Cl.
CPC ... *H04W 52/0229* (2013.01); *H04W 52/0216* (2013.01)

(58) Field of Classification Search
CPC .......... H04W 52/0229; H04W 52/0216; Y02D 30/70
See application file for complete search history.

(56) References Cited

U.S. PATENT DOCUMENTS 9,713,087 B2    7/2017  Asterjadhi et al.
9,877,350 B2    1/2018  Abdallah et al.
(Continued)

FOREIGN PATENT DOCUMENTS

EP         3820225 A1 *  5/2021    ........ H04W 72/0426
KR    10-2017-0112527       10/2017
(Continued)

OTHER PUBLICATIONS

International Search Report dated Jan. 10, 2023 for PCT/KR2022/014823.
Notification of Publication dated Apr. 13, 2023.

*Primary Examiner* — Marcos L Torres
(74) *Attorney, Agent, or Firm* — NIXON & VANDERHYE P.C.

(57)    ABSTRACT

An electronic device comprises: a communication circuit configured to transmit and/or receive data to and/or from a first external electronic device connected through short-range wireless communication; and a processor. The processor may be configured to: receive, from the first external electronic device, target wake time (TWT) parameters of the first external electronic device; transmit a request signal for information related to TWT parameters of a second external electronic device belonging to a basic service set (BSS) different from a BSS including the electronic device and the first external electronic device; determine whether to configure TWT parameters of the first external electronic device (Continued)

900

START

RECEIVE TWT PARAMETERS OF FIRST EXTERNAL ELECTRONIC DEVICE ~810

TRANSMIT REQUEST SIGNAL FOR INFORMATION RELATED TO TWT PARAMETERS OF SECOND EXTERNAL ELECTRONIC DEVICE BELONGING TO BSS DIFFERENT FROM BSS INCLUDING ELECTRONIC DEVICE AND FIRST EXTERNAL ELECTRONIC DEVICE ~820

DETERMINE WHETHER TO CONFIGURE TWT PARAMETERS BASED ON WHETHER RESPONSE SIGNAL IS RECEIVED ~830

CONFIGURE TWT PARAMETERS OF FIRST EXTERNAL ELECTRONIC DEVICE BASED ON TWT PARAMETERS OF SECOND EXTERNAL ELECTRONIC DEVICE INCLUDED IN RESPONSE SIGNAL ~840

END based on whether a response signal corresponding to the request signal is received; and configure the TWT parameters of the first external electronic device based on TWT parameters.

14 Claims, 12 Drawing Sheets

(56)                    References Cited

U.S. PATENT DOCUMENTS

| | | |
|---|---|---|
| 10,993,171 B2 | 4/2021 | Patil et al. |
| 11,197,242 B2 | 12/2021 | Monajemi et al. |
| 11,553,522 B1 * | 1/2023 | Shukla ................ H04W 74/002 |
| 2014/0301294 A1 | 10/2014 | Kwon et al. |
| 2017/0359300 A1 | 12/2017 | Patil et al. |
| 2018/0295573 A1 | 10/2018 | Gidvani et al. |
| 2018/0332534 A1 | 11/2018 | Hou et al. |
| 2019/0253972 A1 | 8/2019 | Park et al. |
| 2020/0037395 A1 | 1/2020 | Ko et al. |
| 2021/0068008 A1 * | 3/2021 | Asterjadhi ............ H04W 76/10 |
| 2021/0306955 A1 * | 9/2021 | Han ...................... H04W 16/02 |

FOREIGN PATENT DOCUMENTS

| | | |
|---|---|---|
| KR | 10-2019-0018138 A | 2/2019 |
| KR | 10-2019-0131047 A | 11/2019 |
| KR | 10-2020-0120587 | 10/2020 |
| WO | WO 2023-059012 A1 | 4/2023 |

* cited by examiner

COMMUNICATION CIRCUIT          PROCESSOR

710

| 711 | 712 | 713 | 714 | 715 |
|------|--------|--------------|------------|-------------|
| ID | Length | Request Type | Time Stamp | TWT element |

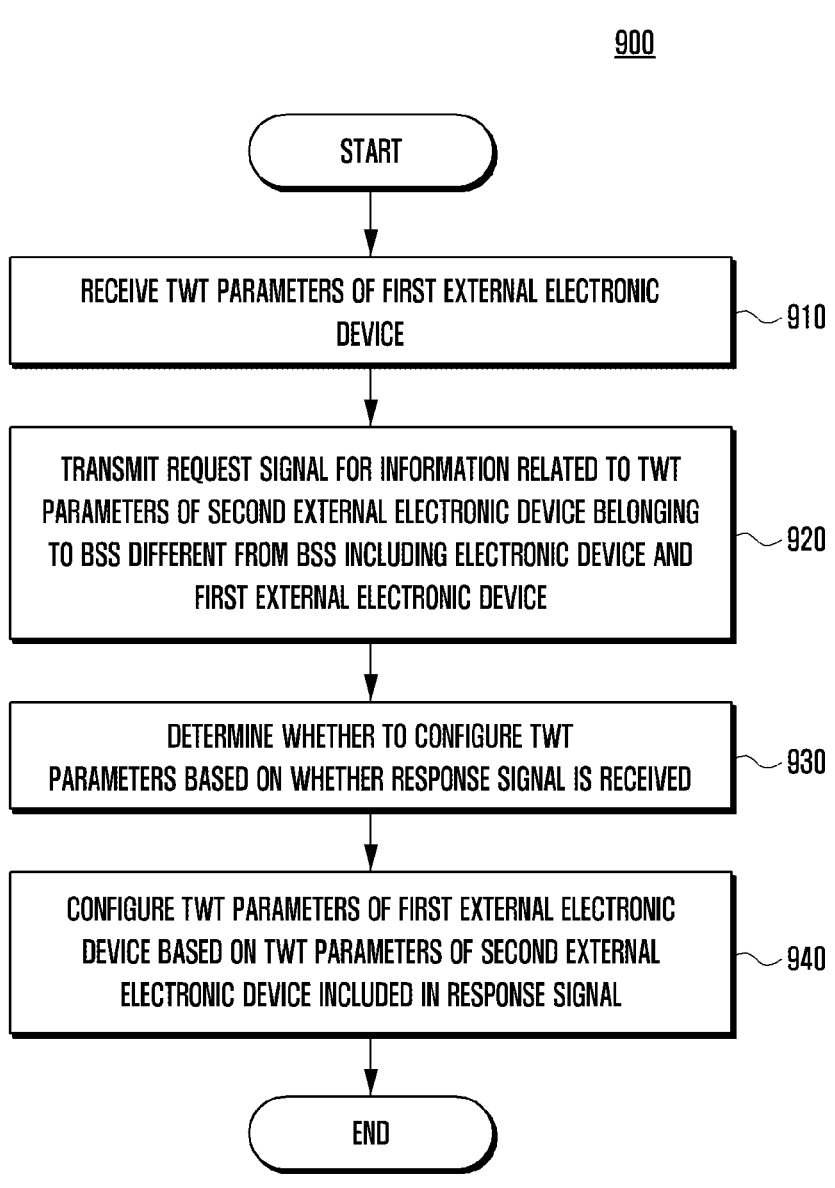

900

START

RECEIVE TWT PARAMETERS OF FIRST EXTERNAL ELECTRONIC DEVICE ⟋910

TRANSMIT REQUEST SIGNAL FOR INFORMATION RELATED TO TWT PARAMETERS OF SECOND EXTERNAL ELECTRONIC DEVICE BELONGING TO BSS DIFFERENT FROM BSS INCLUDING ELECTRONIC DEVICE AND FIRST EXTERNAL ELECTRONIC DEVICE ⟋920

DETERMINE WHETHER TO CONFIGURE TWT PARAMETERS BASED ON WHETHER RESPONSE SIGNAL IS RECEIVED ⟋930

CONFIGURE TWT PARAMETERS OF FIRST EXTERNAL ELECTRONIC DEVICE BASED ON TWT PARAMETERS OF SECOND EXTERNAL ELECTRONIC DEVICE INCLUDED IN RESPONSE SIGNAL ⟋940

END

ELECTRONIC DEVICE AND OPERATION METHOD THEREOF FOR SETTING TARGET WAKE TIME PARAMETERS BASED ON RESPONSE SIGNAL RECEIVED FROM EXTERNAL ELECTRONIC DEVICE OF DIFFERENT BASIC SERVICE SET

CROSS-REFERENCE TO RELATED APPLICATIONS

This application is a continuation of International Application No. PCT/KR202 2/014823 designating the United States, filed on Sep. 30, 2022, in the Korean Intellectual Property Receiving Office and claiming priority to Korean Patent Application No. 10-2021-0134016, filed on Oct. 8, 2021, in the Korean Intellectual Property Office, and to Korean Patent Application No. 10-2021-0157594, filed on Nov. 16, 2021, the disclosures of which are all hereby incorporated by reference herein in their entireties.

TECHNICAL FIELD

Various example example embodiments relate to an electronic device and/or an operation method thereof, and/or to a technique for setting TWT parameters based on a response signal received from an external electronic device of another BSS.

BACKGROUND

Along with the spread of various electronic devices, the speed of wireless communication that can be used by various electronic devices has been improved. Among wireless communications supported recently by electronic devices, IEEE 802.11 WLAN (or Wi-Fi) is a standard for implementing high-speed wireless connections on various electronic devices. First implemented Wi-Fi could support a transmission rate of up to 1 to 9 Mbps, but Wi-Fi 6 technology (or IEEE 802.11ax) can support a transmission rate of up to about 10 Gbps.

An electronic device may support various services using relatively large amounts of data (e.g., UHD-quality video streaming service, augmented reality (AR) service, virtual reality (VR) service, and/or mixed reality (MR) service) through wireless communication supporting a high transmission speed.

The IEEE 802.11ax technical specification has introduced a target wake time (TWT) feature to improve battery performance of various electronic devices connected to an access point (AP). The TWT feature may be a function of transmitting or receiving data between an electronic device and the AP for a specified time (target wake time duration). The electronic device may transmit or receive data for the specified time, and may not transmit or receive data for a time other than the specified time. The TWT feature is attracting attention as a function capable of reducing power consumption generated when an electronic device performs short-range wireless communication.

SUMMARY

For the specified time (or TWT duration), the electronic device may activate the communication circuit supporting short-range wireless communication to receive data transmitted by an external electronic device included in the same basic service set (BSS) as the electronic device or transmit data to the external electronic device. The electronic device may deactivate the communication circuit for a time other than the specified time.

However, an external electronic device included in a different BSS may transmit or receive data by using the same channel as that used by the electronic device. Among the specified time, the electronic device may be not able to transmit and/or receive data for a time when the external electronic device included in the different BSS transmits or receives data. The electronic device may transmit and/or receive data only when the external electronic device completes data transmission and/or reception.

As the time for the external electronic device included in a different BSS to transmit and/or receive data increases, the electronic device cannot perform data transmission and/or reception, so that the delay time for data transmission and/or reception increases, and the service quality may be degraded.

An electronic device according to various example embodiments may include: a communication circuit configured to transmit and/or receive data to and/or from a first external electronic device connected through short-range wireless communication; and a processor operably connected to the communication circuit, wherein the processor may be configured to: receive, from the first external electronic device connected to the electronic device, target wake time (TWT) parameters of the first external electronic device; transmit a request signal for information related to TWT parameters of a second external electronic device belonging to a basic service set (BSS) different from a BSS including the electronic device and the first external electronic device; determine whether to configure TWT parameters of the first external electronic device based on whether a response signal corresponding to the request signal is received; and configure the TWT parameters of the first external electronic device based on TWT parameters of the second external electronic device included in the response signal.

An electronic device according to various example embodiments may include: a communication circuit configured to transmit and/or receive data to and/or from an external electronic device connected through short-range wireless communication; and a processor operably connected to the communication circuit, wherein the processor may be configured to: receive, from a first external electronic device belonging to a basic service set (BSS) different from a BSS including the electronic device, a request signal for information related to target wake time (TWT) parameters of the electronic device and/or a second external electronic device belonging to the same BSS as that of the electronic device; determine whether to transmit a response signal based on information for determining whether to transmit the response signal included in the request signal; and control the communication circuit to transmit the response signal to the first external electronic device in response to determining to transmit the response signal.

An operation method of an electronic device according to various example embodiments may include: receiving, from a first external electronic device connected to the electronic device, target wake time (TWT) parameters of the first external electronic device; transmitting a request signal for information related to TWT parameters of a second external electronic device belonging to a basic service set (BSS) different from a BSS including the electronic device and the first external electronic device; determining whether to configure TWT parameters of the first external electronic device based on whether a response signal corresponding to the request signal is received; and configuring the TWT parameters of the first external electronic device based on TWT parameters of the second external electronic device included in the response signal.

The electronic device and operation method thereof according to various example embodiments may allow TWT parameters to be exchanged between electronic devices included in different BSSs. Hence, the electronic device may modify the TWT parameters to reduce the overlapping section between TWT durations of electronic devices belonging to different BSSs based on the TWT parameters of the electronic devices belonging to different BSSs. Accordingly, the electronic device may reduce the delay time for data transmission and/or reception due to the overlapping section between the TWT durations of electronic devices belonging to different BSSs.

BRIEF DESCRIPTION OF DRAWINGS

The above and other aspects, features, and advantages of certain embodiments will be more apparent from the following detailed description, taken in conjunction with the accompanying drawings, in which:

FIG. 1 is a block diagram of an electronic device in a network environment according to various example embodiments.

FIG. 4B is a diagram illustrating an embodiment in which a first external electronic device and a second external electronic device perform TWT operations according to various example embodiments.

FIG. 9 is a flowchart illustrating an operation method of an electronic device according to various example embodiments.

DETAILED DESCRIPTION

Figure 1:
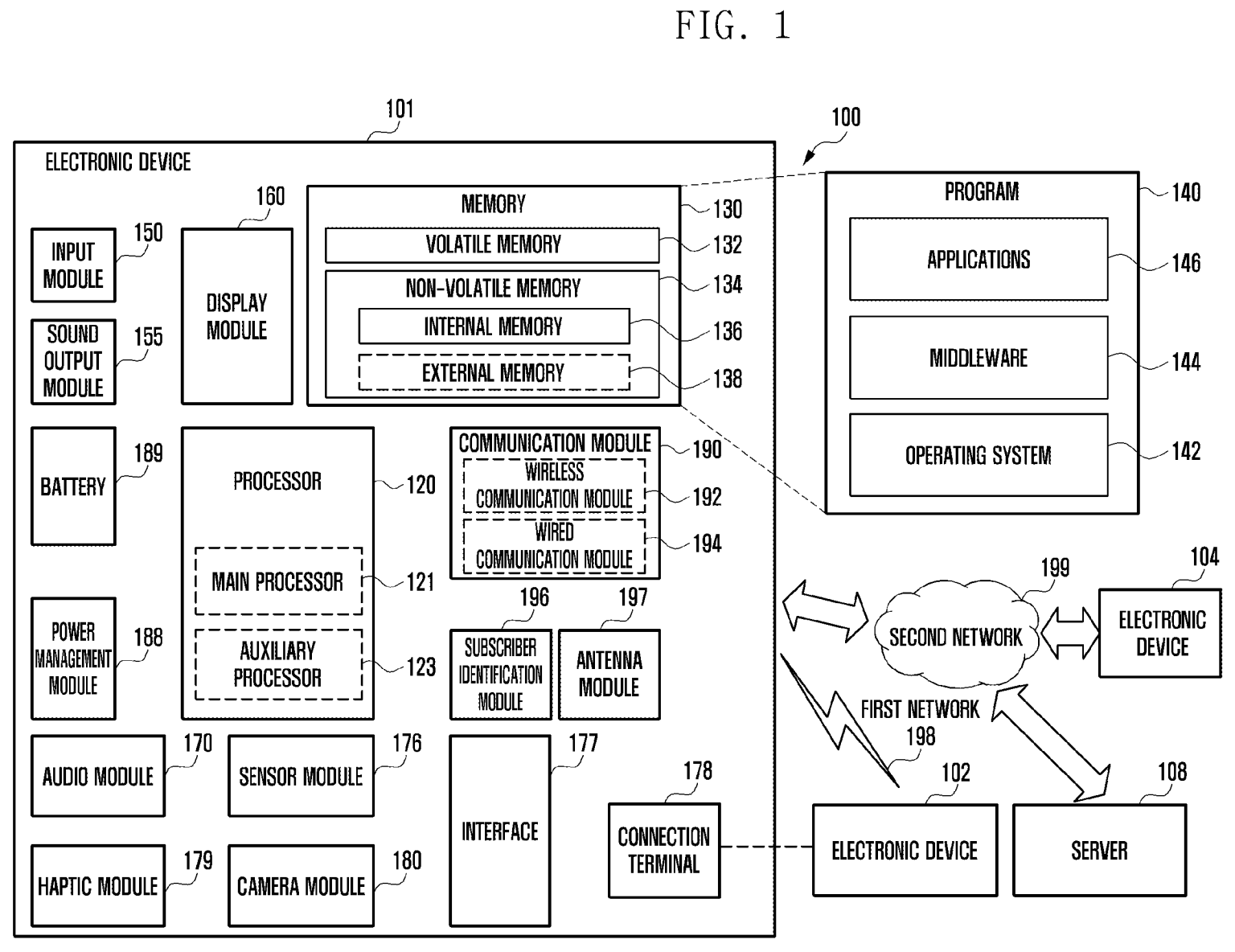
Figure 2:
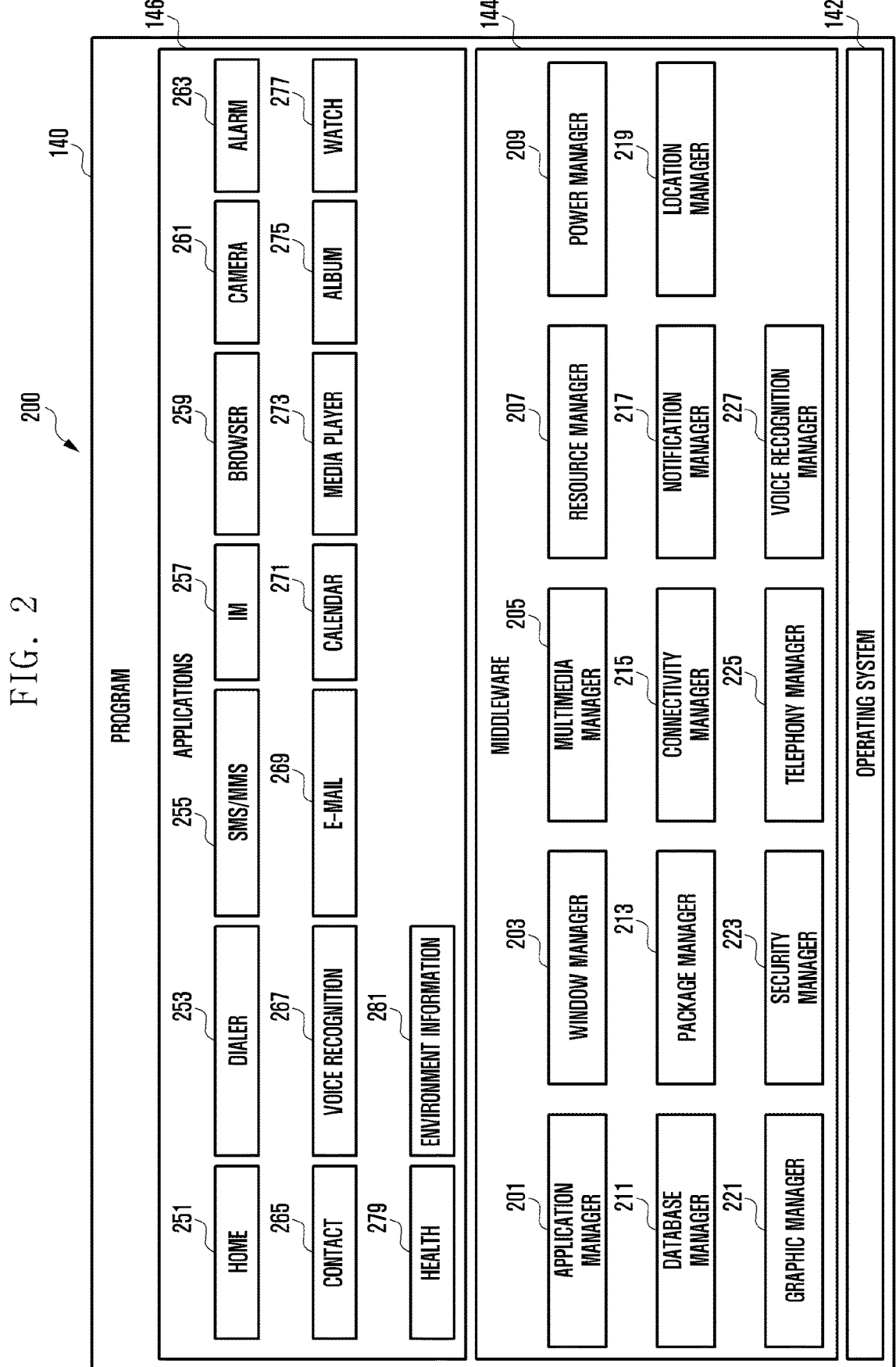
FIG. 2 is a diagram depicting the structure of programs according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

FIG. 2 is a block diagram 200 illustrating the program 140 according to various embodiments. According to an embodiment, the program 140 may include an operating system (OS) 142 to control one or more resources of the electronic device 101, middleware 144, or an application 146 executable in the OS 142. The OS 142 may include, for example, Android™, iOS™, Windows™, Symbian™, Tizen™, or Bada™. At least part of the program 140, for example, may be pre-loaded on the electronic device 101 during manufacture, or may be downloaded from or updated by an external electronic device (e.g., the electronic device 102 or 104, or the server 108) during use by a user.

The OS 142 may control management (e.g., allocating or deallocation) of one or more system resources (e.g., process, memory, or power source) of the electronic device 101. The OS 142, additionally or alternatively, may include one or more driver programs to drive other hardware devices of the electronic device 101, for example, the input module 150, the sound output module 155, the display module 160, the audio module 170, the sensor module 176, the interface 177, the haptic module 179, the camera module 180, the power management module 188, the battery 189, the communication module 190, the subscriber identification module 196, or the antenna module 197.

The middleware 144 may provide various functions to the application 146 such that a function or information provided from one or more resources of the electronic device 101 may be used by the application 146. The middleware 144 may include, for example, an application manager 201, a window manager 203, a multimedia manager 205, a resource manager 207, a power manager 209, a database manager 211, a package manager 213, a connectivity manager 215, a notification manager 217, a location manager 219, a graphic manager 221, a security manager 223, a telephony manager 225, or a voice recognition manager 227.

The application manager 201, for example, may manage the life cycle of the application 146. The window manager 203, for example, may manage one or more graphical user interface (GUI) resources that are used on a screen. The multimedia manager 205, for example, may identify one or more formats to be used to play media files, and may encode or decode a corresponding one of the media files using a codec appropriate for a corresponding format selected from the one or more formats. The resource manager 207, for example, may manage the source code of the application 146 or a memory space of the memory 130. The power manager 209, for example, may manage the capacity, temperature, or power of the battery 189, and determine or provide related information to be used for the operation of the electronic device 101 based at least in part on corresponding information of the capacity, temperature, or power of the battery 189. According to an embodiment, the power manager 209 may interwork with a basic input/output system (BIOS) (not shown) of the electronic device 101.

The database manager 211, for example, may generate, search, or change a database to be used by the application 146. The package manager 213, for example, may manage installation or update of an application that is distributed in the form of a package file. The connectivity manager 215, for example, may manage a wireless connection or a direct connection between the electronic device 101 and the external electronic device. The notification manager 217, for example, may provide a function to notify a user of an occurrence of a specified event (e.g., an incoming call, message, or alert). The location manager 219, for example, may manage locational information on the electronic device 101. The graphic manager 221, for example, may manage one or more graphic effects to be offered to a user or a user interface related to the one or more graphic effects.

The security manager 223, for example, may provide system security or user authentication. The telephony manager 225, for example, may manage a voice call function or a video call function provided by the electronic device 101. The voice recognition manager 227, for example, may transmit a user's voice data to the server 108, and receive, from the server 108, a command corresponding to a function to be executed on the electronic device 101 based at least in part on the voice data, or text data converted based at least in part on the voice data. According to an embodiment, the middleware 244 may dynamically delete some existing components or add new components. According to an embodiment, at least part of the middleware 144 may be included as part of the OS 142 or may be implemented as another software separate from the OS 142.

The application 146 may include, for example, a home 251, dialer 253, short message service (SMS)/multimedia messaging service (MMS) 255, instant message (IM) 257, browser 259, camera 261, alarm 263, contact 265, voice recognition 267, email 269, calendar 271, media player 273, album 275, watch 277, health 279 (e.g., for measuring the degree of workout or biometric information, such as blood sugar), or environmental information 281 (e.g., for measuring air pressure, humidity, or temperature information) application. According to an embodiment, the application 146 may further include an information exchanging application (not shown) that is capable of supporting information exchange between the electronic device 101 and the external electronic device. The information exchange application, for example, may include a notification relay application adapted to transfer designated information (e.g., a call, message, or alert) to the external electronic device or a device management application adapted to manage the external electronic device. The notification relay application may transfer notification information corresponding to an occurrence of a specified event (e.g., receipt of an email) at another application (e.g., the email application 269) of the electronic device 101 to the external electronic device. Additionally or alternatively, the notification relay application may receive notification information from the external electronic device and provide the notification information to a user of the electronic device 101.

The device management application may control the power (e.g., turn-on or turn-off) or the function (e.g., adjustment of brightness, resolution, or focus) of the external electronic device or some component thereof (e.g., a display module or a camera module of the external electronic device). The device management application, additionally or alternatively, may support installation, delete, or update of an application running on the external electronic device.

Figure 3:
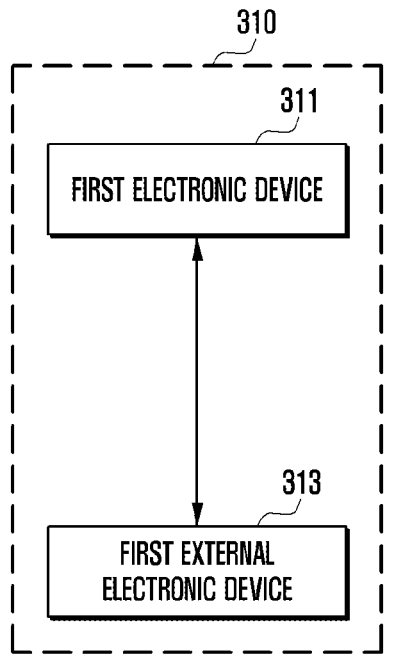
FIG. 3 is a diagram illustrating a first basic service set (BSS) including a first electronic device and a first external electronic device, and a second BSS including a second electronic device and a second external electronic device according to various example embodiments.
Figure 3:
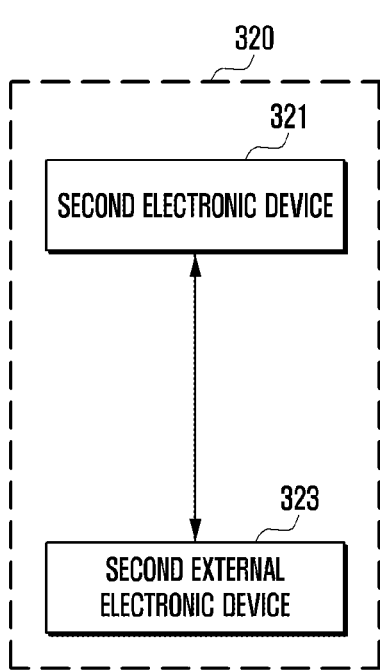

FIG. 3 is a diagram illustrating a first basic service set (BSS) including a first electronic device and a first external electronic device, and a second BSS including a second electronic device and a second external electronic device according to various example embodiments.

With reference to FIG. 3, a first electronic device 311 and/or a first external electronic device 313 may be included in a first basic service set (BSS) 310. The BSS may indicate a logical network unit including one AP (e.g., first electronic device 311), and at least one electronic device (e.g., first external electronic device 313) that transmits or receives data by using short-range wireless communication provided by the AP.

According to an embodiment, the first electronic device 311 may perform wireless communication with the first external electronic device 313 through short-range wireless communication. Short-range wireless communication may refer to a communication scheme that can be supported by both the first electronic device 311 and the first external electronic device 313. For example, wireless communication may be Wi-Fi.

The first electronic device 311 may serve as a base station that provides wireless communication to at least one electronic device (e.g., first external electronic device 313) located within a communication radius of the first BSS 310. For example, the first electronic device 311 may include an IEEE 802.11 access point (AP). The first external electronic device 313 may include an IEEE 802.11 station (STA).

The short-range wireless communication used by the first electronic device 311 and/or the first external electronic device 313 to exchange data may utilize various frequency bands including a first frequency band (e.g., 2.4 GHz), a second frequency band (e.g., 5 GHz) and/or a third frequency band (e.g., 6 GHz). The first electronic device 311 and/or the first external electronic device 313 may establish a channel in one frequency band among the plural frequency bands and exchange data through the established channel.

When the first electronic device 311 and the first external electronic device 313 support multi-link operation (MLO) in WI-FI 7, the first electronic device 311 and/or the first external electronic device 313 may establish one or more channels belonging to one or multiple of the plural frequency bands and exchange data through the established channels.

The second electronic device 321 and/or the second external electronic device 323 may be included in the second basic service set (BSS) 320. The second BSS 320 may be a different BSS from the first BSS 310. Although FIG. 3 shows two BSSs (e.g., first BSS 310 and/or second BSS 320), two or more BSSs may be implemented physically adjacent to each other.

According to an embodiment, the second electronic device 321 may perform wireless communication with the second external electronic device 323 through short-range wireless communication. Short-range wireless communication may refer to a communication scheme that can be supported by both the second electronic device 321 and the second external electronic device 323. For example, wireless communication may be Wi-Fi.

The second electronic device 321 may serve as a base station that provides wireless communication to at least one electronic device (e.g., second external electronic device 323) located within a communication radius of the second BSS 320. For example, the second electronic device 321 may include an IEEE 802.11 access point (AP). The second external electronic device 323 may include an IEEE 802.11 station (STA).

The short-range wireless communication used by the second electronic device 321 and/or the second external electronic device 323 to exchange data may utilize various frequency bands including a first frequency band (e.g., 2.4 GHz), a second frequency band (e.g., 5 GHz) and/or a third frequency band (e.g., 6 GHz). The second electronic device 321 and/or the second external electronic device 323 may establish a channel in one frequency band among the plural frequency bands and exchange data through the established channel.

When the second electronic device 321 and the second external electronic device 323 support multi-link operation (MLO) in WI-FI 7, the second electronic device 321 and/or the second external electronic device 323 may establish one or more channels belonging to one or multiple of the plural frequency bands and exchange data through the established channels.

The first BSS 310 and the second BSS 320 may support a target wake time (TWT) operation in order to reduce power consumption of entities included in its BSS. The TWT operation will be described with reference to FIG. 4A.

Figure 4A:
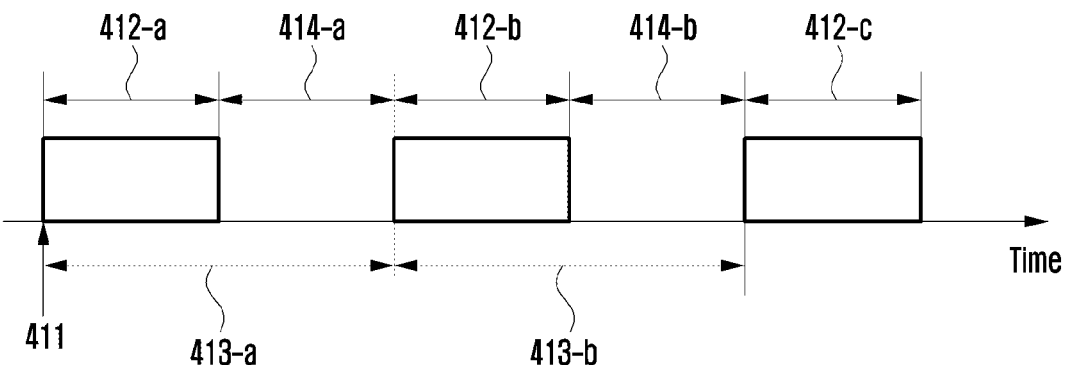
FIG. 4A is a diagram illustrating an embodiment in which an electronic device controls the communication circuit based on a target wake time (TWT) according to various example embodiments.

FIG. 4A is a diagram illustrating an embodiment in which an electronic device controls the communication circuit based on a target wake time (TWT) according to various example embodiments.

The electronic device (e.g., first external electronic device 313 in FIG. 3) may support the target wake time (TWT) in which it receives and/or transmits data every specified time and does not receive and/or transmit data for the remaining time.

TWT is a feature proposed and implemented in IEEE 802.11ax (or Wi-Fi 6), and an electronic device supporting TWT transmits and/or receives data for a specified time through short-range wireless communication and switches the communication circuit supporting short-range wireless communication to idle state (or inactive state) for a time other than the specified time, so that it is possible to reduce power consumed in performing short-range wireless communication.

The first external electronic device 313, in a state being connected to the first electronic device 311, may activate the TWT function through negotiation with the first electronic device 311 and configure TWT parameters. The TWT parameters may be parameters required to perform the TWT function. According to an embodiment, the TWT parameters may include at least one of target wake time 411 indicating the time point of activating data transmission and/or reception, TWT duration (or TWT service period (SP)) (412-a, 412-b or 412-c) indicating a period in which data transmission and/or reception can be performed, and/or TWT wake interval 413-a or 413-b indicating the interval between the activation time of data transmission and/or reception and the next activation time of data transmission and/or reception.

The first external electronic device 313 may transmit the generated TWT parameters to the first electronic device 311 during a negotiation process related to activation of the TWT function. The first external electronic device 313 may transmit a TWT request message including TWT parameters to the first electronic device 311. The first electronic device 311 may transmit data to the first external electronic device 313 for a specific period (e.g., TWT duration 412-a, 412-b, and/or 412-c) based on the TWT parameters.

The first external electronic device 313 may transmit data to the first electronic device 311 for a specific period (e.g., TWT duration 412-a, 412-b, and/or 412-c). The first external electronic device 313 may activate the communication circuit (e.g., wireless communication module 192 in FIG. 1) for a specific period (e.g., TWT duration 412-a, 412-b, and/or 412-c), and may deactivate the communication circuit 192 for the remaining period (e.g., 414-a, and/or 414-b) to thereby reduce power consumed by the communication circuit 192 (e.g., part of communication module 190 and/or wireless communication module 192 in FIG. 1).

The second external electronic device 323, in a state being connected, directly or indirectly, to the second electronic device 321, may activate the TWT function through negotiation with the second electronic device 321 and configure TWT parameters. The TWT parameters may be parameters required to perform the TWT function. According to an embodiment, the TWT parameters may include at least one of target wake time 411 indicating the time point of activating data transmission and/or reception, TWT duration (or TWT service period (SP)) (412-a, 412-b or 412-c) indicating a period in which data transmission and/or reception can be performed, and/or TWT wake interval 413-a or 413-b indicating the interval between the activation time of data transmission and/or reception and the next activation time of data transmission and/or reception.

The second external electronic device 323 may transmit the generated TWT parameters to the second electronic device 321 during a negotiation process related to activation of the TWT function. The second external electronic device 323 may transmit a TWT request message including TWT parameters to the second electronic device 321. The second electronic device 321 may transmit data to the second external electronic device 323 for a specific period (e.g., 412-a, 412-b, and/or 412-c) based on the TWT parameters.

The second external electronic device 323 may transmit data to the second electronic device 321 for a specific period (e.g., 412-a, 412-b, and/or 412-c). The second external electronic device 323 may activate the communication circuit (e.g., wireless communication module 192 in FIG. 1) for a specific period (e.g., 412-a, 412-b, and/or 412-c), and may deactivate the communication circuit 192 for the remaining period (e.g., 414-a, and/or 414-b) to thereby reduce power consumed by the communication circuit 192.

Figure 4B:
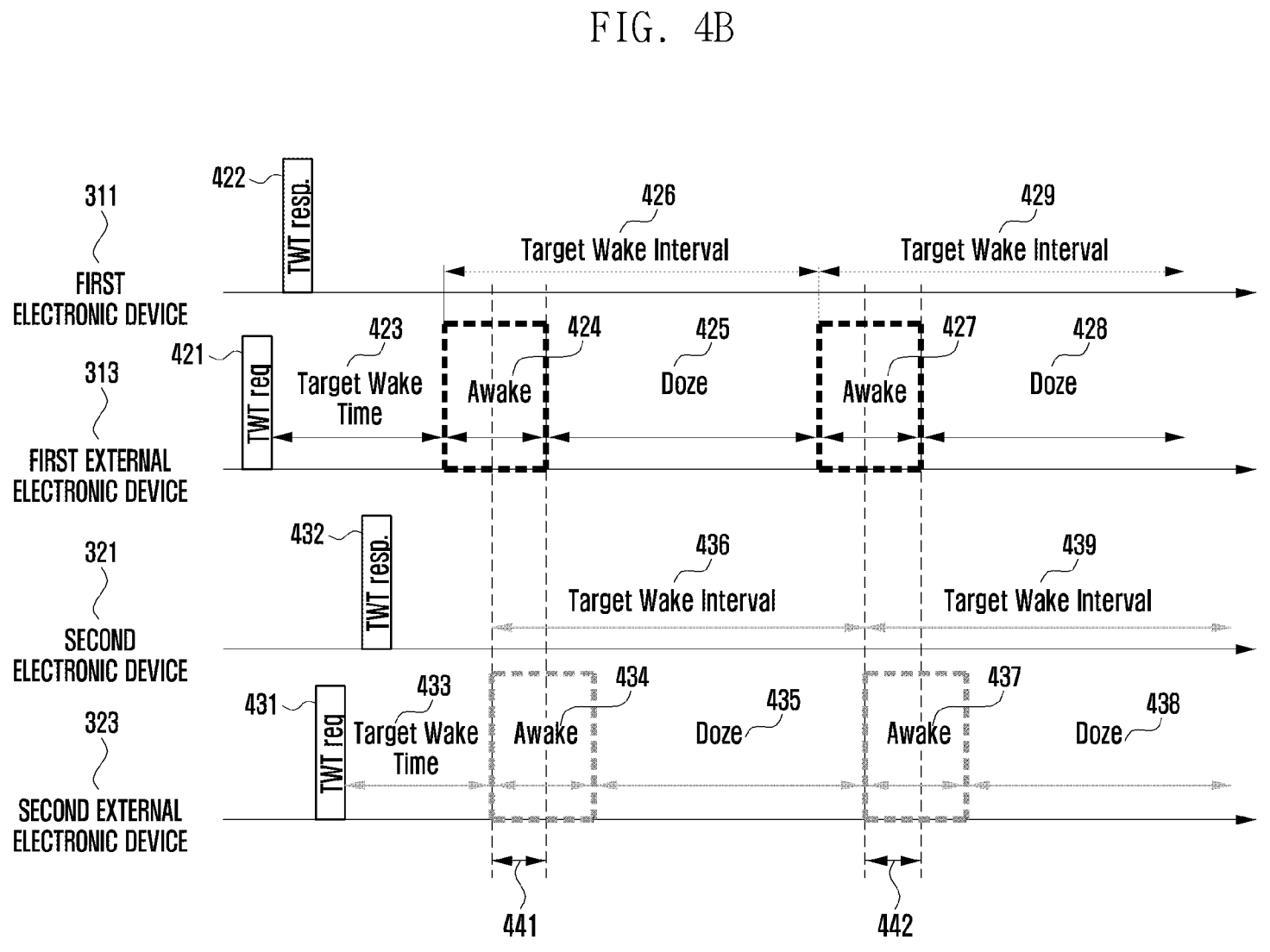

FIG. 4B is a diagram illustrating an embodiment in which a first external electronic device and a second external electronic device perform TWT operations according to various example embodiments.

The first external electronic device (e.g., first external electronic device 313 in FIG. 3), in a state being connected, directly or indirectly, to the first electronic device (e.g., first electronic device 311 in FIG. 3), may activate the TWT function through negotiation with the first electronic device 311 and configure TWT parameters. To activate the TWT function, the first external electronic device 313 may transmit a TWT request message 421 for TWT negotiation to the first electronic device 311. The TWT request message 421 may include TWT parameters generated by the first external electronic device 313. The TWT parameters may be parameters required to perform the TWT function. According to an embodiment, the TWT parameters may include at least one of target wake time 423 indicating the time point of activating data transmission and/or reception, TWT duration (or TWT service period (SP)) (424 or 427) indicating a period in which data transmission and/or reception can be performed, and/or TWT wake interval 426 or 429 indicating the interval between the activation time of data transmission and/or reception and the next activation time of data transmission and/or reception.

Upon receiving the TWT request message 421, the first electronic device 311 may modify (or maintain) the TWT parameters included in the TWT request message 421, and transmit a TWT response message 422 including the modified TWT parameters (or the same TWT parameters included in the TWT request message 421) to the first external electronic device 313.

The first external electronic device 313 may perform an operation based on the TWT parameters included in the TWT response message.

The first external electronic device 313 may transmit data to the first electronic device 311 for a specific period 424 or 427. The first external electronic device 313 may activate the communication circuit (e.g., wireless communication module 192 in FIG. 1) for a specific period 424 or 427 and deactivate the communication circuit 192 for the remaining period 425 or 428, so that it can reduce power consumed by the communication circuit 192.

The second external electronic device (e.g., second external electronic device 323 in FIG. 3), in a state being connected to the second electronic device (e.g., second electronic device 321 in FIG. 3), may activate the TWT function through negotiation with the second electronic device 321 and configure TWT parameters. To activate the TWT function, the second external electronic device 323 may transmit a TWT request message 431 for TWT negotiation to the second electronic device 321. The TWT request message 431 may include TWT parameters generated by the second external electronic device 323. The TWT parameters may be parameters required to perform the TWT function. According to an embodiment, the TWT parameters may include at least one of target wake time 433 indicating the time point of activating data transmission and/or reception, TWT duration (or TWT service period (SP)) (434 or 437) indicating a period in which data transmission and/or reception can be performed, and/or TWT wake interval 436 or 439 indicating the interval between the activation time of data transmission and/or reception and the next activation time of data transmission and/or reception.

Upon receiving the TWT request message 431, the second electronic device 321 may modify (or maintain) the TWT parameters included in the TWT request message 431, and transmit a TWT response message 432 including the modified TWT parameters (or the same TWT parameters included in the TWT request message 431) to the second external electronic device 323.

The second external electronic device 323 may perform an operation based on the TWT parameters included in the TWT response message.

The second external electronic device 323 may transmit data to the second electronic device 321 for a specific period 434 or 437. The second external electronic device 323 may activate the communication circuit (e.g., wireless communication module 192 in FIG. 1) for a specific period 434 or 437 and deactivate the communication circuit 192 for the remaining period 435 or 438, so that it can reduce power consumed by the communication circuit 192.

With reference to FIG. 4B, the duration 424 or 427 in which the communication circuit 192 of the first external electronic device 313 is activated and the duration 434 or 437 in which the communication circuit 192 of the second external electronic device 323 is activated may partially overlap in a section 441 or 442.

If the channel between the first external electronic device 313 and the first electronic device 311 and the channel between the second external electronic device 323 and the second electronic device 321 are the same, and there is an overlapping section 441 or 442, while the first external electronic device 313 transmits and/or receives data in the overlapping section 441 or 442, the second external electronic device 323 may be unable to transmit and/or receive data in the overlapping section 441 or 442. The second electronic device 323 may transmit and/or receive data after the first external electronic device 313 completes data transmission and/or reception. As the length of the overlapping section 441 or 442 increases, the latency of transmitting and/or receiving data of the second electronic device 323 may increase.

IEEE 802.11ax has disclosed a technique of setting (or changing) TWT parameters between electronic devices belonging to the same BSS, but has not implemented a technique of setting TWT parameters between electronic devices belonging to different BSSs, and thus the phenomenon shown in FIG. 4B may frequently occur.

Next, an embodiment of reducing the overlapping section between TWT durations of electronic devices belonging to different BSSs will be described. Each embodiment herein may be used in combination with any other embodiment described herein.

Figure 5:
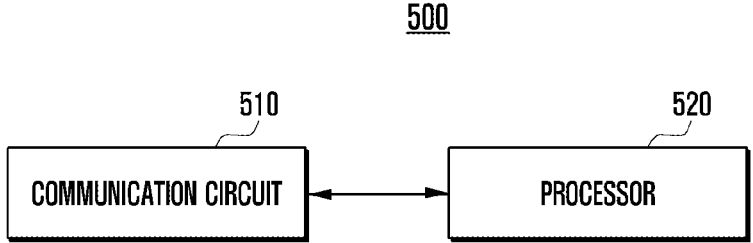
FIG. 5 is a block diagram of an electronic device according to various example embodiments.

FIG. 5 is a block diagram of an electronic device according to various example embodiments.

According to various example embodiments, the electronic device 500 (e.g., first electronic device 311 in FIG. 3) may include a communication circuit 510 (e.g., wireless communication module 192 in FIG. 1), and/or a processor 520 including processing circuitry (e.g., processor 120 in FIG. 1).

The communication circuit 510 may include various circuit structures used for modulation and/or demodulation of a signal in the electronic device 500. For example, the communication circuit 510 may modulate a baseband signal into a radio frequency (RF) band signal and output it through an antenna (not shown) (e.g., antenna module 197 in FIG. 1), or may demodulate an RF band signal received through an antenna into a baseband signal and deliver it to the processor 520.

The processor 520 may receive data output by the application processor (e.g., processor 120 in FIG. 1) and generate a packet to transmit the received data to the external electronic device. The processor 520 may be a communication processor included in the communication module (e.g., wireless communication module 192 in FIG. 1). According to an embodiment, the processor 520, including processing circuitry, may generate a packet through channel coding based on data output by the application processor (e.g., application processor 120 in FIG. 1), or may check whether there is an error in at least some of data transmitted by the external electronic device and perform an error recovery operation (e.g., hybrid automatic repeat request (HARQ)) when an error has occurred. Each "processor" herein comprises processing circuitry.

The processor 520 may be operably connected, directly or indirectly, to the communication circuit 510 and control the operation of the communication circuit 510. To support the target wake time (TWT) function, the processor 520 may perform TWT negotiation with a first external electronic device (e.g., first external electronic device 313 in FIG. 3). The processor 520 may receive TWT parameters generated by the first external electronic device 313 during the TWT negotiation process. Alternatively, the processor 520 may generate TWT parameters to be used by the first external electronic device 313.

According to an embodiment, the processor 520 may generate TWT parameters based on the state of the electronic device 500 and/or the state of the first external electronic device 313. The state of the electronic device 500 may include at least one of the size of data (or traffic) to be transmitted or received by the electronic device 500, quality of service (QoS) requirements, or the contention level of a channel to be created between the electronic device 500 and the first external electronic device 313. The state of the first external electronic device 313 may include at least one of the size of data (or traffic) to be transmitted or received by the first external electronic device 313, quality of service (QoS) requirements, or the contention level of a channel to be created between the electronic device 500 and the first external electronic device 313.

The processor 520 may receive and/or generate TWT parameters including at least one of target wake time (e.g., 411 in FIG. 4A, 423 in FIG. 4B) indicating the time point of activating data transmission and/or reception, TWT duration (or TWT service period (SP)) (e.g., 412-a, 412-b or 412-c in FIG. 4A, 424 or 427 in FIG. 4B) indicating a period in which data transmission and/or reception can be performed, and/or TWT wake interval (e.g., 413-a or 413-b in FIG. 4A, 426 or 429 in FIG. 4B) indicating the interval between the activation time of data transmission and/or reception and the next activation time of data transmission and/or reception.

For example, the processor 520 may receive and/or generate a TWT duration having a relatively long length and/or a TWT wake interval having a relatively short length based on performing a service that requires relatively high-capacity data transmission and requires relatively low latency. Or, the processor 520 may receive and/or generate a TWT duration having a relatively short length and/or a TWT wake interval having a relatively long length based on performing a service that requires relatively low-capacity data transmission and does not require relatively low latency.

The processor 520 may perform an operation based on the TWT parameters included in the TWT response message. The processor 520 may control the communication circuit 510 to transmit data to the first external electronic device 313 for the TWT duration 424 or 427. The processor 520 may not transmit data to the first external electronic device 313 for a communication deactivation period 425 or 428 of the first external electronic device 313.

While transmitting or receiving data to or from the first external electronic device 313, the processor 520 may sense that another external electronic device (e.g., second electronic device 321 and/or second external electronic device 323 in FIG. 3) transmits and/or receives data over a channel identical to the channel generated between the first external electronic device 313 and the electronic device 500. According to an embodiment, the processor 520 may parse data received through a channel identical to the channel generated between the first external electronic device 313 and the electronic device 500, and may identify that the received data has been transmitted by an external electronic device (e.g., 321 or 323) other than the first external electronic device 313. The processor 520 may determine whether the channel generated between the first external electronic device 313 and the electronic device 500 satisfies a specified condition, and may perform a series of operations to obtain TWT parameters of the entities belonging to a BSS (e.g., second BSS 320 in FIG. 3) different from the BSS (e.g., first BSS 310 in FIG. 3) including the electronic device 500 and the first external electronic device 313 in response to the channel satisfying the specified condition.

According to an embodiment, the specified condition may be a condition related to channel utilization, and may include that the channel utilization is greater than or equal to (or greater than) a specified value.

For example, the processor 520 may calculate a ratio that the first external electronic device 313 may occupy on the channel based on the channel utilization occupied by devices (e.g., second electronic device 321 and/or second external electronic device 323) other than the first external electronic device 313. The processor 520 may determine the channel utilization to be used by the first external electronic device 313 based on the TWT duration (e.g., TWT duration 441 or 442 in FIG. 4B) and the TWT wake interval (e.g., TWT wake interval 436 or 439 in FIG. 4B) among the TWT parameters transmitted by the first external electronic device 313. The processor 520 may compare the ratio that the first external electronic device 313 may occupy on the channel with the determined channel utilization, and may perform a series of operations to obtain TWT parameters of the entities (e.g., second electronic device 321 and/or second external electronic device 323 in FIG. 3) belonging to a different BSS (e.g., second BSS 320 in FIG. 3) based on the comparison result. If the determined channel utilization is greater than a specified value (e.g., a value determined based on the ratio that the first external electronic device 313 may occupy on the channel), the processor 520 may perform a series of operations to obtain TWT parameters of the entities (e.g., second electronic device 321 and/or second external electronic device 323 in FIG. 3) belonging to a different BSS (e.g., second BSS 320 in FIG. 3).

According to another embodiment, the processor 520 may perform a series of operations to obtain TWT parameters of the entities 321 and 323 belonging to a different BSS 320 as part of a process of generating and/or modifying the TWT parameters of the first external electronic device 321 during the TWT negotiation process.

The processor 520 may control the communication circuit 510 to transmit a request signal for TWT parameters of the second external electronic device 323 to the second electronic device 321 (or, second external electronic device 323). The second electronic device 321 and/or the second external electronic device 323 can transmit and/or receive data through a channel identical to the channel established between the electronic device 500 and the first external electronic device 313, so that they can receive a request signal for TWT parameters transmitted by the electronic device 500.

The TWT parameter request signal may include information for determining whether to transmit a response signal in correspondence to the TWT parameter request signal and/or TWT parameters of the first external electronic device 321.

When there are multiple external electronic devices (e.g., first external electronic device 321) connected to the first electronic device 311 through short-range wireless communication, the TWT parameter request signal may include TWT parameters of each of the multiple external electronic devices.

The TWT parameters of the first external electronic device 321 may include at least one of target wake time (e.g., 411 in FIG. 4A, 423 in FIG. 4B) indicating the time point of activating data transmission and/or reception, TWT duration (e.g., 412-a, 412-b or 412-c in FIG. 4A, 424 or 427 in FIG. 4B) indicating a period in which data transmission and/or reception can be performed, and/or TWT wake interval (e.g., 413-a or 413-b in FIG. 4A, 426 or 429 in FIG. 4B) indicating the interval between the activation time of data transmission and/or reception and the next activation time of data transmission and/or reception.

The information for determining whether to transmit a response signal may be information for the second electronic device 321 to compare it with the TWT parameters of the second external electronic device 323. The information for determining whether to transmit a response signal may include information for calculating the maximum value of the TWT interval (e.g., TWT wake interval exponent 723 in FIG. 7B, maximum TWT wake interval mantissa 726 in FIG. 7B) and/or information for calculating the minimum value of the TWT duration (e.g., wake duration unit 724 in FIG. 7B, minimum nominal TWT wake duration 725 in FIG. 7B). Each "unit" here may comprise circuitry, and each "module" herein may comprise circuitry.

The maximum value of the TWT interval is the maximum value of the interval that can overlap the TWT duration 424 or 427 of the first external electronic device 313 and the TWT duration 434 or 437 of the second external electronic device 323; when the second external electronic device 323 performs the TWT operation by using an interval greater than the maximum value of the TWT interval, the probability that the TWT duration 424 or 427 of the first external electronic device 313 and the TWT duration 434 or 437 of the second external electronic device 323 overlap each other can be reduced.

The minimum value of the TWT duration is the minimum value of the TWT duration that may overlap the TWT duration 424 or 427 of the first external electronic device 313 and the TWT duration 434 or 437 of the second external electronic device 323; when the second external electronic device 323 performs the TWT operation by using a TWT duration less than the minimum value of the TWT duration, the probability that the TWT duration 424 or 427 of the first external electronic device 313 and the TWT duration 434 or 437 of the second external electronic device 323 overlap each other can be reduced.

The maximum value of the TWT interval and the minimum value of the TWT duration may be determined through various methods in addition to the above-described method. In addition, the processor 520 may determine (or adjust) the maximum value of the TWT interval and the minimum value of the TWT duration in further consideration of the number of external electronic devices (e.g., second external electronic device 323) using a channel identical to the channel established between the first external electronic device 313 and the electronic device 500 (or, channel of a similar frequency band). For example, as the number of external electronic devices (e.g., second external electronic device 323) using a channel identical to the channel established between the first external electronic device 313 and the electronic device 500 (or, channel of a similar frequency band) increases, the processor 520 may increase the maximum value of the TWT interval or decrease the minimum value of the TWT duration.

The processor 520 may identify the size of the TWT duration 424 or 427 and/or the size of the TWT interval 426 or 429 of the first external electronic device 313, and determine the maximum value of the TWT interval and/or the minimum value of the TWT duration based on the identified sizes. Based on the determined maximum value of the TWT interval and/or minimum value of the TWT duration, the processor 520 may generate information for calculating the maximum value of the TWT interval (e.g., TWT wake interval exponent, maximum TWT wake interval mantissa), and/or the minimum value of the TWT duration (e.g., wake duration unit, minimum nominal TWT wake duration).

The second electronic device 321 may calculate (or determine) the maximum value of the TWT interval based on the information for calculating the maximum value of the TWT interval, and may calculate (or determine) the minimum value of the TWT duration based on the information for calculating the minimum value of the TWT duration.

The second electronic device 321 may identify the TWT interval 436 or 439 of the second external electronic device 323, and identify whether the TWT interval 436 or 439 of the second external electronic device 323 is less than the maximum value of the TWT interval. The second electronic device 321 may determine to transmit a response signal based on the TWT interval 436 or 439 of the second external electronic device 323 being less than the maximum value of the TWT interval.

The second electronic device 321 may identify the length of the TWT duration 434 or 437 of the second external electronic device 323, and identify whether the length of the TWT duration 434 or 437 of the second external electronic device 323 is greater than the minimum value of the TWT duration. The second electronic device 321 may determine to transmit a response signal based on the length of the TWT duration 434 or 437 of the second external electronic device 323 being greater than the minimum value of the TWT duration.

Or, the second electronic device 321 may determine to transmit a response signal based on the TWT interval 436 or 439 of the second external electronic device 323 being less than the maximum value of the TWT interval and the length of the TWT duration 434 or 437 of the second external electronic device 323 being greater than the minimum value of the TWT duration.

Or, the second electronic device 321 may identify the TWT parameters of the first external electronic device 313 included in the request signal, and may identify whether the TWT duration of the first external electronic device 313 overlaps the TWT duration of the second external electronic device 323 and/or whether the size of the overlapping section between the TWT duration of the first external electronic device 313 and the TWT duration of the second external electronic device 323 is greater than or equal to (or, greater than) a specified size. The second electronic device 321 may determine to transmit a response signal based on confirming that the size of the overlapping section between the TWT duration of the first external electronic device 313 and the TWT duration of the second external electronic device 323 is greater than or equal to (or, greater than) the specified size.

Or, the second electronic device 321 may determine to transmit a response signal in response to receiving a request signal including an indicator (e.g., reply-all field 722 in FIG. 7B) indicating that all electronic devices receiving the request signal should send a response signal.

The response signal may include TWT parameters of the second electronic device 321 and/or the second external electronic device 323. The TWT parameters included in the response signal may include at least one of target wake time 433 indicating the time point of activating data transmission and/or reception, TWT duration (or TWT service period (SP)) 434 or 437 indicating a period in which data transmission and/or reception can be performed, and/or TWT wake interval 436 or 439 indicating the interval between the activation time of data transmission and/or reception and the next activation time of data transmission and/or reception.

The processor 520 may receive the response signal and identify TWT parameters of the second electronic device 321 and/or the second external electronic device 323 included in the response signal.

The processor 520 may determine whether to configure (or modify) the TWT parameters of the first external electronic device 313 based on whether the response signal has been received. The situation in which the second electronic device 321 has transmitted the response signal may indicate a situation in which the length of the overlapping section between the TWT duration of the first external electronic device 313 and the TWT duration of the second external electronic device 323 is greater than or equal to (or greater than) the specified size.

The processor 520 may determine whether to configure (or modify) the TWT parameters of the first external electronic device 313 based on the TWT parameters of the second electronic device 321 and/or the second external electronic device 323.

The processor 520 may configure (or modify) the TWT parameters of the first external electronic device 313 so that the TWT duration 424 or 427 of the first external electronic device 313 does not overlap the TWT duration 434 or 437 of the second external electronic device 323 or the length of the overlapping section is less than or equal to (or less than) the specified size.

The processor 520 may change the channel between the first external electronic device 313 and the electronic device 500 in response to determining that it is not possible to configure the TWT parameters so that the TWT duration 424 or 427 of the first external electronic device 313 does not overlap the TWT duration 434 or 437 of the second external electronic device 323 or the length of the overlapping section is less than or equal to (or less than) the specified size. The processor 520 may change the channel between the first external electronic device 313 and the electronic device 500 to a channel with a channel number or of a frequency band different from that of the channel between the second external electronic device 323 and the second electronic device 321.

Through the methods described above, TWT parameters may be exchanged between electronic devices belonging to different BSSs (e.g., electronic device 500, second electronic devices 321, and/or second external electronic device 323), and it is possible to reduce the overlapping section between the TWT durations of the electronic devices belonging to different BSSs, so that it is possible to reduce the delay time for data transmission and/or reception due to the overlapping section between the TWT durations of the electronic devices belonging to different BSSs.

Figure 6:
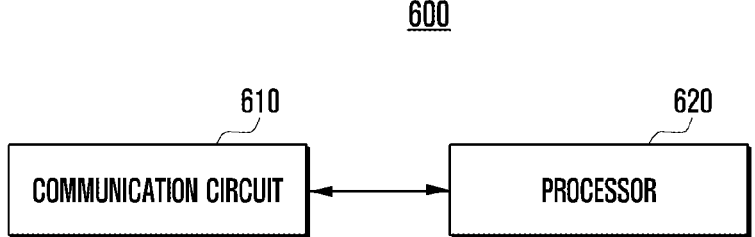
FIG. 6 is a block diagram of an electronic device according to various example embodiments.

FIG. 6 is a block diagram of an electronic device according to various example embodiments.

According to various example embodiments, the electronic device 600 (e.g., second electronic device 321 in FIG. 3) may include a communication circuit 610 (e.g., wireless communication module 192, including communication circuitry, in FIG. 1) and/or a processor 620 (e.g., processor 120 in FIG. 1).

The communication circuit 610 may include various circuit structures used for modulation and/or demodulation of a signal in the electronic device 600. For example, the communication circuit 610 may modulate a baseband signal into a radio frequency (RF) band signal and output it through an antenna (not shown) (e.g., antenna module 197, including at least one antenna, in FIG. 1), or may demodulate an RF band signal received through an antenna into a baseband signal and deliver it to the processor 620.

The processor 620 may receive data output by the application processor (e.g., processor 120 in FIG. 1) and generate a packet to transmit the received data to the external electronic device. The processor 620 may be defined as a communication processor included in the communication module (e.g., wireless communication module 192, comprising communication circuitry, in FIG. 1). According to an embodiment, the processor 620 may generate a packet through channel coding based on data output by the application processor (e.g., application processor 120 in FIG. 1), or may check whether there is an error in at least some of data transmitted by the external electronic device and perform an error recovery operation (e.g., hybrid automatic repeat request (HARQ)) when an error has occurred.

The processor 620, including processing circuitry, may be operably connected, directly or indirectly, to the communication circuit 610 and control the operation of the communication circuit 610. To support the target wake time (TWT) function, the processor 620 may perform TWT negotiation with a second external electronic device (e.g., second external electronic device 323 in FIG. 3). The processor 620 may receive TWT parameters generated by the second external electronic device 323 during the TWT negotiation process. Alternatively, the processor 620 may generate TWT parameters to be used by the second external electronic device 323.

According to an embodiment, the processor 620 may generate TWT parameters based on the state of the electronic device 600 and/or the state of the second external electronic device 323. The state of the electronic device 600 may include at least one of the size of data (or traffic) to be transmitted or received by the electronic device 600, quality of service (QoS) requirements, or the contention level of a channel to be created between the electronic device 600 and the second external electronic device 323. The state of the second external electronic device 323 may include at least one of the size of data (or traffic) to be transmitted or received by the second external electronic device 323, quality of service (QoS) requirements, or the contention level of a channel to be created between the electronic device 600 and the second external electronic device 323.

The processor 620 may receive and/or generate TWT parameters including at least one of target wake time (e.g., 411 in FIG. 4A, 433 in FIG. 4B) indicating the time point of activating data transmission and/or reception, TWT duration (e.g., 412-a, 412-b or 412-c in FIG. 4A, 434 or 437 in FIG. 4B) indicating a period in which data transmission and/or reception can be performed, and/or TWT wake interval (e.g., 413-*a* or 413-*b* in FIG. 4A, 436 or 439 in FIG. 4B) indicating the interval between the activation time of data transmission and/or reception and the next activation time of data transmission and/or reception.

For example, the processor 620 may receive and/or generate a TWT duration having a relatively long length and/or a TWT wake interval having a relatively short length based on performing a service that requires relatively high-capacity data transmission and requires relatively low latency. Or, the processor 620 may receive and/or generate a TWT duration having a relatively short length and/or a TWT wake interval having a relatively long length based on performing a service that requires relatively low-capacity data transmission and does not require relatively low latency.

The processor 620 may perform an operation based on the TWT parameters included in the TWT response message. The processor 620 may control the communication circuit 610 to transmit data to the second external electronic device 323 for the TWT duration 434 or 437. The processor 520 may not transmit data to the second external electronic device 323 for a communication deactivation period 435 or 438 of the second external electronic device 323.

The processor 620 may receive a request signal for TWT parameters of the second external electronic device 323 transmitted by the first electronic device 311. The electronic device 600 and/or the second external electronic device 323 can transmit and/or receive data through a channel identical to the channel established between the first electronic device 311 and the first external electronic device 313, so that they can receive a request signal for TWT parameters transmitted by the first electronic device 311.

The TWT parameter request signal may include information for determining whether to transmit a response signal in correspondence to the TWT parameter request signal and/or TWT parameters of the first external electronic device (e.g., 313).

The TWT parameters of the first external electronic device (e.g., 313) may include at least one of target wake time (e.g., 411 in FIG. 4A, 423 in FIG. 4B) indicating the time point of activating data transmission and/or reception, TWT duration (e.g., 412-*a*, 412-*b* or 412-*c* in FIG. 4A, 424 or 427 in FIG. 4B) indicating a period in which data transmission and/or reception can be performed, and/or TWT wake interval (e.g., 413-*a* or 413-*b* in FIG. 4A, 426 or 429 in FIG. 4B) indicating the interval between the activation time of data transmission and/or reception and the next activation time of data transmission and/or reception.

The information for determining whether to transmit a response signal may be information for the processor 620 to compare it with the TWT parameters of the second external electronic device 323. The information for determining whether to transmit a response signal may include information for calculating the maximum value of the TWT interval (e.g., TWT wake interval exponent 723 in FIG. 7B, maximum TWT wake interval mantissa 726 in FIG. 7B) and/or information for calculating the minimum value of the TWT duration (e.g., wake duration unit 724 in FIG. 7B, minimum nominal TWT wake duration 725 in FIG. 7B).

The maximum value of the TWT interval is the maximum value of the interval that can overlap the TWT duration 424 or 427 of the first external electronic device 313 and the TWT duration 434 or 437 of the second external electronic device 323; when the second external electronic device 323 performs the TWT operation by using an interval greater than the maximum value of the TWT interval, the TWT duration 424 or 427 of the first external electronic device 313 and the TWT duration 434 or 437 of the second external electronic device 323 may not overlap each other or the probability of overlapping can be reduced.

The minimum value of the TWT duration is the minimum value of the TWT duration that may overlap the TWT duration 424 or 427 of the first external electronic device 313 and the TWT duration 434 or 437 of the second external electronic device 323; when the second external electronic device 323 performs the TWT operation by using a TWT duration less than the minimum value of the TWT duration, the TWT duration 424 or 427 of the first external electronic device 313 and the TWT duration 434 or 437 of the second external electronic device 323 may not overlap each other or the probability of overlapping can be reduced.

The processor 620 may calculate (or determine) the maximum value of the TWT interval based on the information for calculating the maximum value of the TWT interval, and may calculate (or determine) the minimum value of the TWT duration based on the information for calculating the minimum value of the TWT duration.

The processor 620 may identify the TWT interval 436 or 439 of the second external electronic device 323, and identify whether the TWT interval 436 or 439 of the second external electronic device 323 is less than the maximum value of the TWT interval. The processor 620 may determine to transmit a response signal based on the TWT interval 436 or 439 of the second external electronic device 323 being less than the maximum value of the TWT interval.

The processor 620 may identify the length of the TWT duration 434 or 437 of the second external electronic device 323, and identify whether the length of the TWT duration 434 or 437 of the second external electronic device 323 is greater than the minimum value of the TWT duration. The processor 620 may determine to transmit a response signal based on the length of the TWT duration 434 or 437 of the second external electronic device 323 being greater than the minimum value of the TWT duration.

Or, the processor 620 may determine to transmit a response signal based on the TWT interval 436 or 439 of the second external electronic device 323 being less than the maximum value of the TWT interval and the length of the TWT duration 434 or 437 of the second external electronic device 323 being greater than the minimum value of the TWT duration.

Or, the processor 620 may identify the TWT parameters of the first external electronic device 313 included in the request signal, and may identify whether the TWT duration of the first external electronic device 313 overlaps the TWT duration of the second external electronic device 323 and/or whether the size of the overlapping section between the TWT duration of the first external electronic device 313 and the TWT duration of the second external electronic device 323 is greater than or equal to (or, greater than) a specified size. The second electronic device 321 may determine to transmit a response signal based on confirming that the size of the overlapping section between the TWT duration of the first external electronic device 313 and the TWT duration of the second external electronic device 323 is greater than or equal to (or, greater than) the specified size.

Or, the processor 620 may determine to transmit a response signal in response to receiving a request signal including an indicator (e.g., reply-all field 722 in FIG. 7B) indicating that all electronic devices receiving the request signal should send a response signal.

The response signal may include TWT parameters of the electronic device 600 and/or the second external electronic device 323. The TWT parameters included in the response signal may include at least one of target wake time 433 indicating the time point of activating data transmission and/or reception, TWT duration (or TWT service period (SP)) 434 or 437 indicating a period in which data transmission and/or reception can be performed, and/or TWT wake interval 436 or 439 indicating the interval between the activation time of data transmission and/or reception and the next activation time of data transmission and/or reception.

According to another embodiment, the processor 620 may configure (or, change) the TWT parameters of the second external electronic device 323 in response to identifying that the length of the overlapping section between the TWT duration of the first external electronic device 313 and the TWT duration of the second external electronic device 323 is greater than or equal to (or greater than) the specified size.

The processor 620 may configure (or modify) the TWT parameters of the second external electronic device 323 so that the TWT duration 424 or 427 of the first external electronic device 313 does not overlap the TWT duration 434 or 437 of the second external electronic device 323 or the length of the overlapping section is less than or equal to (or less than) the specified size.

The processor 620 may change the channel between the second external electronic device 323 and the electronic device 600 in response to determining that it is not possible to configure the TWT parameters so that the TWT duration 424 or 427 of the first external electronic device 313 does not overlap the TWT duration 434 or 437 of the second external electronic device 323 or the length of the overlapping section is less than or equal to (or less than) the specified size. The processor 620 may change the channel between the second external electronic device 323 and the electronic device 600 to a channel with a channel number or of a frequency band different from that of the channel between the first external electronic device 313 and the first electronic device 311.

Through the methods described above, TWT parameters may be exchanged between electronic devices belonging to different BSSs (e.g., electronic device 500, second electronic devices 321, and/or second external electronic device 323), and it is possible to reduce the overlapping section between the TWT durations of the electronic devices belonging to different BSSs, so that it is possible to reduce the delay time for data transmission and/or reception due to the overlapping section between the TWT durations of the electronic devices belonging to different BSSs.

Figure 7A:
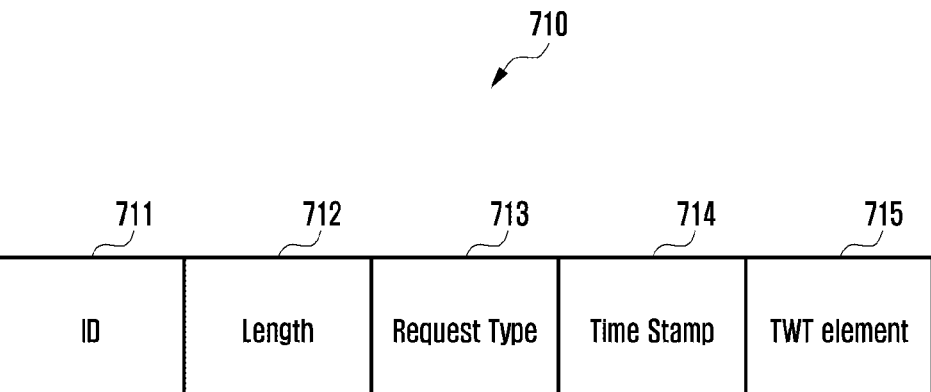
FIG. 7A is a diagram illustrating the structure of a signal used by an electronic device to request information related to TWT parameters of an external electronic device belonging to a BSS different from that of the electronic device according to various example embodiments.

FIG. 7A is a diagram illustrating the structure of a signal used by an electronic device to request information related to TWT parameters of an external electronic device belonging to a BSS different from that of the electronic device according to various example embodiments.

With reference to FIG. 7A, the request signal 710 may include an identification information field 711 including identification information for the request signal 710, a length field 712 indicating the length of the request signal 710, a request type field 713 containing data used to determine whether to transmit a response signal corresponding to the request signal 710, a time stamp field 714 containing time information of the electronic device transmitting the request signal 710 (e.g., electronic device 500 in FIG. 5) or a BSS including the electronic device 500 (e.g., first BSS 310 in FIG. 3), and/or a TWT element field including information related to TWT parameters of an electronic device (e.g., 311 and/or 313 in FIG. 3) that is connected to the electronic device 500 transmitting the request signal 710 and performs a TWT operation. Some of the fields shown in FIG. 7A may be omitted, and the field names may be changed.

When there are plural external electronic devices connected, directly or indirectly, to the electronic device 500 through short-range wireless communication, the request signal 710 may include TWT parameters for each of the plural external electronic devices. For example, the request signal 710 may include a TWT element field 715 including information related to TWT parameters for each of the plural external electronic devices. The request signal may include the same number of TWT element fields 715 as the number of external electronic devices connected to the electronic device 500.

Figure 7B:
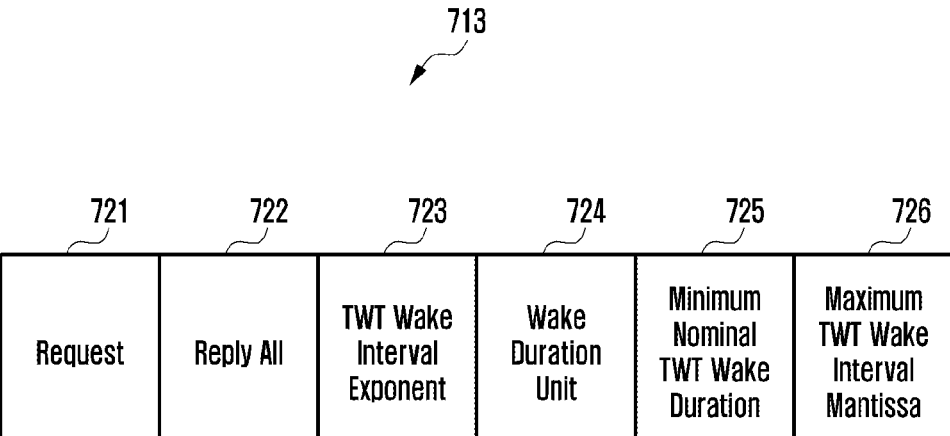
FIG. 7B is a diagram illustrating the structure of a signal used by an electronic device to request information related to TWT parameters of an external electronic device belonging to a BSS different from that of the electronic device according to various example embodiments.

FIG. 7B is a diagram illustrating the structure of a signal used by an electronic device to request information related to TWT parameters of an external electronic device belonging to a BSS different from that of the electronic device according to various example embodiments.

FIG. 7B is a diagram showing the structure of the request type field 713 of a request signal (e.g., request signal 710 in FIG. 7A). The request type field 713 may include a request field 721 indicating whether it is a request signal 710 or a response signal corresponding to the request signal 710, a reply all field 722 indicating a condition for an electronic device to transmit a response signal corresponding to the request signal 710, a TWT wake interval exponent field 723 including a TWT wake interval exponent being one of the values used to calculate the maximum value of the interval, a wake duration unit field 724 indicating the unit of duration, a minimum nominal TWT wake duration field 725 including a minimum nominal TWT wake duration that is a value used to calculate the minimum value of the duration, and/or a maximum TWT wake interval mantissa field 726 including the maximum TWT wake interval mantissa being one of the values used to calculate the maximum value of the interval.

The value (e.g., 1) included in the request field 721 when the request signal 710 is a request for TWT parameters may be different from the value (e.g., 0) included in the request field 721 when the request signal 710 is a response signal containing TWT parameters.

The second electronic device (e.g., electronic device 600 in FIG. 6) having received the request signal 710 may determine whether to transmit a response signal based on a transmission condition for the response signal included in the reply all field 722.

The transmission condition for the response signal included in the reply all field 722 may indicate satisfaction of a first condition (e.g., the value of the reply all field 722 is 1) or satisfaction of both a first condition and a second condition (e.g., the value of the reply all field 722 is 0).

The first condition may include a condition that the TWT duration of the second external electronic device 323 is less than the maximum value of the TWT interval determined based on information for calculating the maximum value of the TWT interval included in the request type 713 (e.g., TWT wake interval exponent 723, maximum TWT wake interval mantissa 726), and the TWT interval of the second external electronic device 323 is greater than the minimum value of the TWT duration determined based on information for calculating the minimum value of the TWT duration (e.g., wake duration unit 724, minimum nominal TWT wake duration 725).

The second electronic device 600 may determine the maximum value of the TWT interval according to Equation 1 below.

$$\text{Maximum value of TWT interval(maximum TWT wake interval constraint)} = \text{(maximum TWT wake interval mantissa)} * 2^{(TWT\ wake\ interval\ exponent)}$$

[Equation 1]

The second electronic device 600 may determine the minimum value of the TWT duration according to Equation 2 below.

$$\text{Minimum value of TWT duration TWT(minimum TWT wake duration constraint)}=\text{(minimum nominal TWT wake duration)}*\text{(wake duration unit)} \quad \text{[Equation 2]}$$

(for example, here, wake duration unit may be 256 μs when a first value (e.g., 0) is included in the wake duration unit field 724, and may be 1024 μs when a second value (e.g., 1) is included in the wake duration unit field 724)

The second electronic device 600 may identify that the transmission condition for the response signal included in the reply all field 722 is satisfaction of the first condition, and may determine transmission of the response signal based on whether the first condition is satisfied.

The second condition may be or include a condition that the overlapping section between the TWT duration of the first external electronic device 313 determined based on the value included in the TWT element field 715 (e.g., see FIG. 7A) and the TWT duration of the second external electronic device 323 is greater than or equal to a specified size.

The second electronic device 600 may identify that the transmission condition for the response signal included in the reply all field 722 is satisfaction of the first condition and the second condition, and may determine transmission of the response signal based on whether the first condition and the second condition are satisfied.

Figure 8A:
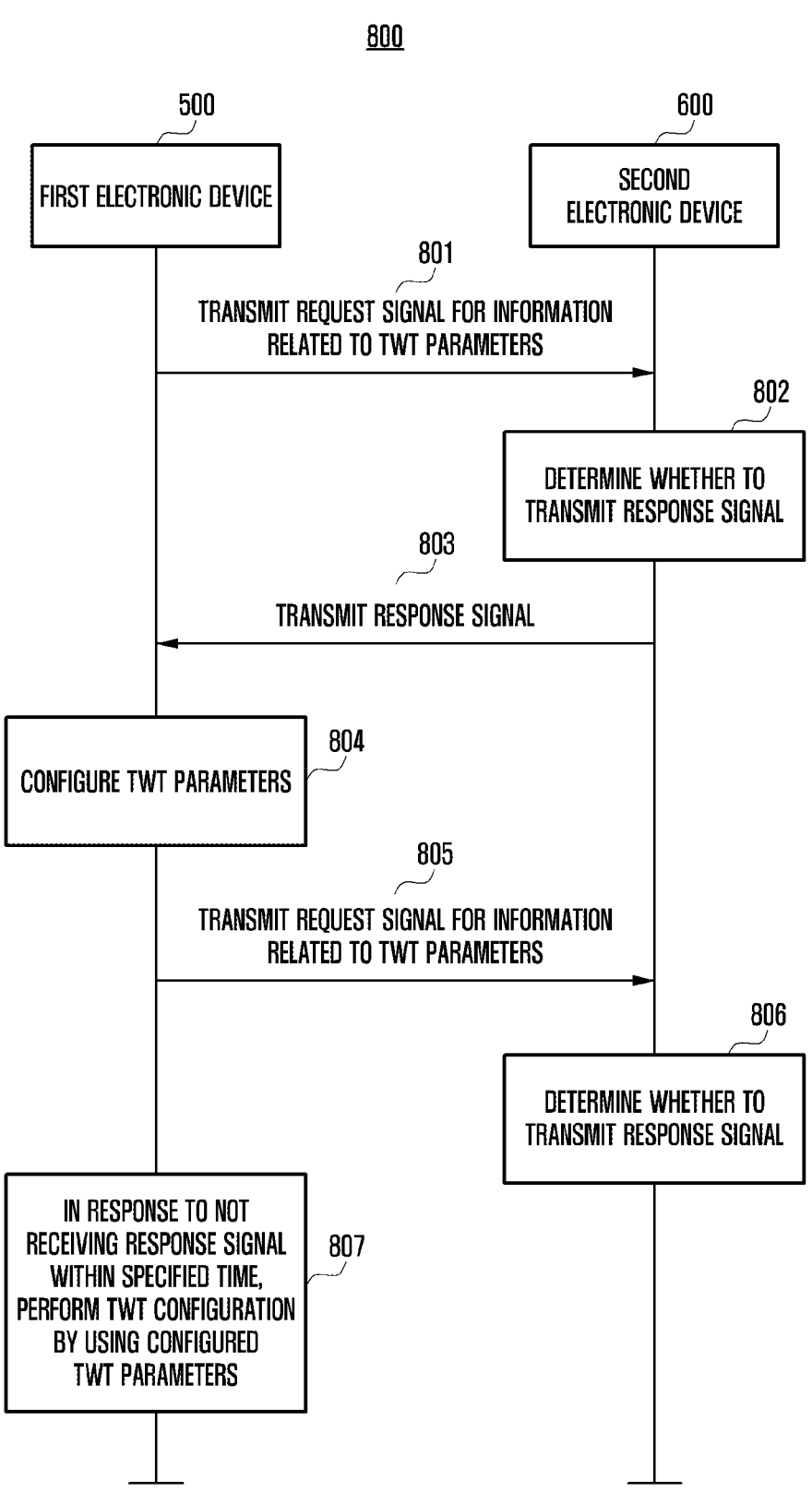
FIG. 8A is a sequence diagram illustrating operations of a first electronic device and a second electronic device according to various example embodiments.

FIG. 8A is a sequence diagram illustrating operations of a first electronic device and a second electronic device according to various example embodiments.

At operation 801, the first electronic device (e.g., electronic device 500 in FIG. 5) may transmit a request signal for information related to TWT parameters of the second electronic device (e.g., electronic device 600 in FIG. 6) and/or a second external electronic device (e.g., second external electronic device 323 in FIG. 3) belonging to the same BSS as the second electronic device 600.

While transmitting or receiving data to or from a first external electronic device (e.g., first external electronic device 313), the first electronic device 500 may sense that another external electronic device (e.g., second electronic device 321 in FIG. 3 and/or second external electronic device 600) transmits and/or receives data over a channel identical to the channel generated between the first external electronic device 313 and the electronic device 500.

According to an embodiment, the first electronic device 500 may parse data received through the channel identical to the channel generated between the first external electronic device 313 and the electronic device 500, and may identify that the received data has been transmitted by a different external electronic device 321 or 323 other than the first external electronic device 313. The first electronic device 500 may determine whether the channel generated between the first external electronic device 313 and the electronic device 500 satisfies a specified condition, and may perform a series of operations to obtain TWT parameters of the entities belonging to a BSS (e.g., second BSS 320 in FIG. 3) different from the BSS (e.g., first BSS 310 in FIG. 3) including the electronic device 500 and the first external electronic device 313 in response to the channel satisfying the specified condition (e.g., channel utilization is greater than or equal to (or greater than) a specified value).

According to another embodiment, the first electronic device 500 may perform a series of operations to obtain TWT parameters of the entities 321 and 323 belonging to a different BSS 320 as part of a process of generating and/or modifying the TWT parameters of the first external electronic device 321 during the TWT negotiation process.

The first electronic device 500 may control the communication circuit 510 to transmit a request signal for TWT parameters of the second external electronic device 323 to the second electronic device 600 (or, second external electronic device 323). The second electronic device 600 and/or the second external electronic device 323 can transmit and/or receive data through a channel identical to the channel established between the electronic device 500 and the first external electronic device 313, so that they can receive a request signal for TWT parameters transmitted by the electronic device 500.

The TWT parameter request signal may include information for determining whether to transmit a response signal in correspondence to the TWT parameter request signal and/or TWT parameters of the first external electronic device 321.

The TWT parameters of the first external electronic device 321 may include at least one of target wake time (e.g., 411 in FIG. 4A, 423 in FIG. 4B) indicating the time point of activating data transmission and/or reception, TWT duration (e.g., 412-*a*, 412-*b* or 412-*c* in FIG. 4A, 424 or 427 in FIG. 4B) indicating a period in which data transmission and/or reception can be performed, and/or TWT wake interval (e.g., 413-*a* or 413-*b* in FIG. 4A, 426 or 429 in FIG. 4B) indicating the interval between the activation time of data transmission and/or reception and the next activation time of data transmission and/or reception.

The information for determining whether to transmit a response signal may be information for the second electronic device 600 to compare it with the TWT parameters of the second external electronic device 323. The information for determining whether to transmit a response signal may include information for calculating the maximum value of the TWT interval (e.g., TWT wake interval exponent, maximum TWT wake interval mantissa) and/or information for calculating the minimum value of the TWT duration (e.g., wake duration unit, minimum nominal TWT wake duration).

The maximum value of the TWT interval is the maximum value of the interval that can overlap the TWT duration 424 or 427 of the first external electronic device 313 and the TWT duration 434 or 437 of the second external electronic device 323; when the second external electronic device 323 performs the TWT operation by using an interval greater than the maximum value of the TWT interval, the TWT duration 424 or 427 of the first external electronic device 313 and the TWT duration 434 or 437 of the second external electronic device 323 may not overlap each other or the probability of overlapping can be reduced.

The minimum value of the TWT duration is the minimum value of the TWT duration that may overlap the TWT duration 424 or 427 of the first external electronic device 313 and the TWT duration 434 or 437 of the second external electronic device 323; when the second external electronic device 323 performs the TWT operation by using a TWT duration less than the minimum value of the TWT duration, the TWT duration 424 or 427 of the first external electronic device 313 and the TWT duration 434 or 437 of the second external electronic device 323 may not overlap each other or the probability of overlapping can be reduced.

At operation 802, the second electronic device 600 may determine whether to transmit a response signal.

The second electronic device 600 may calculate (or determine) the maximum value of the TWT interval based on the information for calculating the maximum value of the TWT interval, and may calculate (or determine) the minimum value of the TWT duration based on the information for calculating the minimum value of the TWT duration.

The second electronic device 600 may identify the TWT interval 436 or 439 of the second external electronic device 323, and identify whether the TWT interval 436 or 439 of the second external electronic device 323 is less than the maximum value of the TWT interval. The second electronic device 600 may determine to transmit a response signal based on the TWT interval 436 or 439 of the second external electronic device 323 being less than the maximum value of the TWT interval.

The second electronic device 600 may identify the length of the TWT duration 434 or 437 of the second external electronic device 323, and identify whether the length of the TWT duration 434 or 437 of the second external electronic device 323 is greater than the minimum value of the TWT duration. The second electronic device 600 may determine to transmit a response signal based on the length of the TWT duration 434 or 437 of the second external electronic device 323 being greater than the minimum value of the TWT duration.

Or, the second electronic device 600 may determine to transmit a response signal based on the TWT interval 436 or 439 of the second external electronic device 323 being less than the maximum value of the TWT interval and the length of the TWT duration 434 or 437 of the second external electronic device 323 being greater than the minimum value of the TWT duration.

Or, the second electronic device 600 may identify the TWT parameters of the first external electronic device 313 included in the request signal, and may identify whether the TWT duration of the first external electronic device 313 overlaps the TWT duration of the second external electronic device 323 and/or whether the size of the overlapping section between the TWT duration of the first external electronic device 313 and the TWT duration of the second external electronic device 323 is greater than or equal to (or, greater than) a specified size. The second electronic device 600 may determine to transmit a response signal based on confirming that the size of the overlapping section between the TWT duration of the first external electronic device 313 and the TWT duration of the second external electronic device 323 is greater than or equal to (or, greater than) the specified size.

Or, the second electronic device 600 may determine to transmit a response signal in response to receiving a request signal including an indicator indicating that all electronic devices receiving the request signal should send a response signal.

The response signal may include TWT parameters of the second electronic device 600 and/or the second external electronic device 323. The TWT parameters included in the response signal may include at least one of target wake time 433 indicating the time point of activating data transmission and/or reception, TWT duration (or TWT service period (SP)) 434 or 437 indicating a period in which data transmission and/or reception can be performed, and/or TWT wake interval 436 or 439 indicating the interval between the activation time of data transmission and/or reception and the next activation time of data transmission and/or reception.

At operation 803, according to determining to transmit a response signal, the second electronic device 600 may transmit a response signal to the first electronic device 500.

At operation 804, the first electronic device 500 may configure TWT parameters in response to receiving the response signal transmitted by the second electronic device 600.

The first electronic device 500 may determine whether to configure (or modify) the TWT parameters of the first external electronic device 313 based on whether the response signal has been received. The situation in which the second electronic device 600 has transmitted the response signal may be or include a situation in which the length of the overlapping section between the TWT duration of the first external electronic device 313 and the TWT duration of the second external electronic device 323 is greater than or equal to (or greater than) the specified size.

The first electronic device 500 may configure (or modify) the TWT parameters of the first external electronic device 313 so that the TWT duration 424 or 427 of the first external electronic device 313 does not overlap the TWT duration 434 or 437 of the second external electronic device 323 or the length of the overlapping section is less than or equal to (or less than) the specified size.

The first electronic device 500 may change the channel between the first external electronic device 313 and the electronic device 500 in response to determining that it is not possible to configure the TWT parameters so that the TWT duration 424 or 427 of the first external electronic device 313 does not overlap the TWT duration 434 or 437 of the second external electronic device 323 or the length of the overlapping section is less than or equal to (or less than) the specified size. The first electronic device 500 may change the channel between the first external electronic device 313 and the electronic device 500 to a channel with a channel number or of a frequency band different from that of the channel between the second external electronic device 323 and the second electronic device 321.

At operation 805, the first electronic device 500 may transmit a request signal for information related to TWT parameters again to the second electronic device 600.

The request signal for information related to TWT parameters transmitted at operation 805 may include the TWT parameters of the first external electronic device 313 configured at operation 804.

At operation 806, the second electronic device 600 may determine whether to transmit a response signal in response to reception of the request signal.

The second electronic device 600 may determine whether to transmit a response signal with reference to the reply all field (e.g., 722 in FIG. 7B) indicating the condition of an electronic device to transmit a response signal corresponding to the request signal. The second electronic device 600 may determine not to transmit a response signal in response to confirming that the duration of the first external electronic device 313 and the duration of the second external electronic device 323 do not overlap by more than a specified length.

At operation 807, in response to not receiving a response signal within a specified time, the first electronic device 500 may perform a TWT configuration for the first external electronic device 313 by using the TWT parameters configured at operation 804.

As part of the TWT configuration operation for the first external electronic device 313, the first electronic device 500 may transmit the configured TWT parameters to the first external electronic device 313, and may control the first external electronic device 313 to perform a TWT operation according to the configured TWT parameters.

It is illustrated in FIG. 8A that the second electronic device 600 determines whether to transmit a response signal and transmits a response signal, but the second external electronic device 323 other than the second electronic device 600 may determine whether to transmit a response signal and transmit a response signal.

Figure 8B:
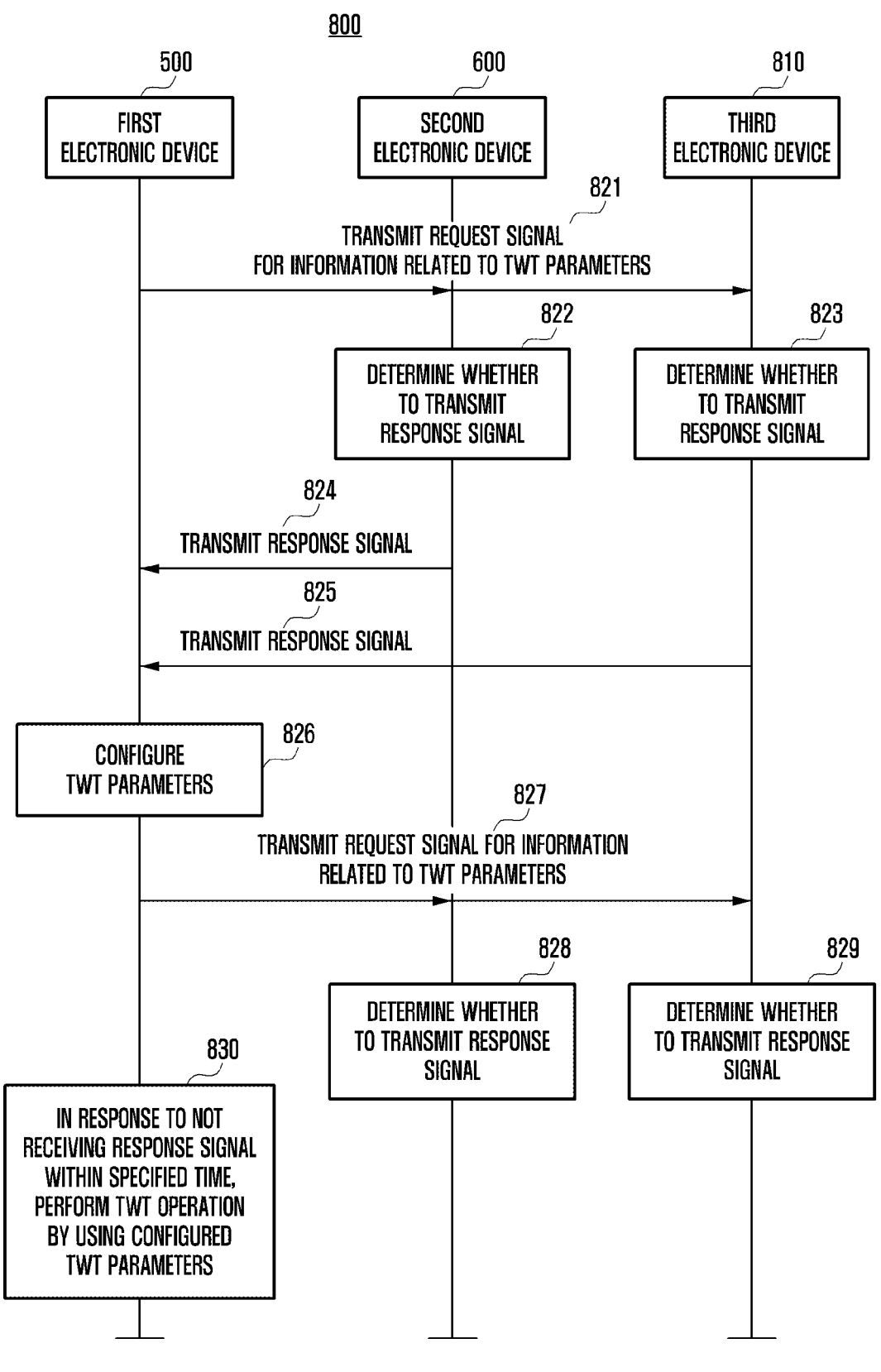
FIG. 8B is a sequence diagram illustrating operations of a first electronic device, a second electronic device and a third electronic device according to various example embodiments.

FIG. 8B is a sequence diagram illustrating operations of a first electronic device, a second electronic device and a third electronic device according to various example embodiments.

At operation 821, the first electronic device (e.g., electronic device 500 in FIG. 5) may transmit a request signal for information related to TWT parameters to the second electronic device (e.g., electronic device 600 in FIG. 6) and/or the third electronic device 810.

The third electronic device 810 may be an electronic device belonging to a BSS different from the BSS of the first electronic device 500 and the BSS of the second electronic device 600, and may be an electronic device performing short-range wireless communication through a channel identical to the channel between the first electronic device 500 and a first external electronic device (e.g., first external electronic device 313 in FIG. 3).

While transmitting or receiving data to or from the first external electronic device (first external electronic device 313 in FIG. 3), the first electronic device 500 may sense that another external electronic device (e.g., second electronic device 321 in FIG. 3, second external electronic device 600, and/or third electronic device 810) transmits and/or receives data over a channel identical to the channel generated between the first external electronic device 313 and the first electronic device 500.

According to an embodiment, the first electronic device 500 may parse data received through a channel identical to the channel generated between the first external electronic device 313 and the first electronic device 500, and may identify that the received data has been transmitted by an external electronic device 321 or 323 other than the first external electronic device 313. The first electronic device 500 may determine whether the channel generated between the first external electronic device 313 and the first electronic device 500 satisfies a specified condition, and may perform a series of operations to obtain TWT parameters of the entities (e.g., second electronic device 600, second external electronic device 323, and/or third electronic device 810) belonging to a BSS (e.g., second BSS 320 in FIG. 3) different from the BSS (e.g., first BSS 310 in FIG. 3) including the first electronic device 500 and the first external electronic device 313 in response to the channel satisfying the specified condition (e.g., channel utilization is greater than or equal to (or greater than) a specified value).

According to another embodiment, the first electronic device 500 may perform a series of operations to obtain TWT parameters of the entities (e.g., second electronic device 600, third electronic device 810) belonging to a different BSS as part of a process of generating and/or modifying the TWT parameters of the first external electronic device 313 and/or 321 during the TWT negotiation process.

The first electronic device 500 may control the communication circuit 510 to transmit a request signal for TWT parameters of the second external electronic device 323 to the second electronic device 600 (or, second external electronic device 323). The second electronic device 600 and/or the second external electronic device 323 can transmit and/or receive data through a channel identical to the channel established between the first electronic device 500 and the first external electronic device 313 and/or 321, so that they can receive a request signal for TWT parameters transmitted by the first electronic device 500.

The TWT parameter request signal may include information for determining whether to transmit a response signal in correspondence to the TWT parameter request signal and/or TWT parameters of the first external electronic device (e.g., 313 and/or 321).

The TWT parameters of the first external electronic device (e.g., 313 and/or 321) may include at least one of target wake time (e.g., 411 in FIG. 4A, 423 in FIG. 4B) indicating the time point of activating data transmission and/or reception, TWT duration (e.g., 412-$a$, 412-$b$ or 412-$c$ in FIG. 4A, 424 or 427 in FIG. 4B) indicating a period in which data transmission and/or reception can be performed, and/or TWT wake interval (e.g., 413-$a$ or 413-$b$ in FIG. 4A, 426 or 429 in FIG. 4B) indicating the interval between activation time of data transmission and/or reception and the next activation time of data transmission and/or reception.

The information for determining whether to transmit a response signal may be information for the second electronic device 600 to compare it with the TWT parameters of the second external electronic device 323. The information for determining whether to transmit a response signal may include information for calculating the maximum value of the TWT interval (e.g., TWT wake interval exponent, maximum TWT wake interval mantissa) and/or information for calculating the minimum value of the TWT duration (e.g., wake duration unit, minimum nominal TWT wake duration).

The maximum value of the TWT interval is the maximum value of the interval that can overlap the TWT duration 424 or 427 of the first external electronic device 313 and the TWT duration 434 or 437 of the second external electronic device 323; when the second external electronic device 323 performs the TWT operation by using an interval greater than the maximum value of the TWT interval, the TWT duration 424 or 427 of the first external electronic device 313 and the TWT duration 434 or 437 of the second external electronic device 323 may not overlap each other or the probability of overlapping can be reduced.

The minimum value of the TWT duration is the minimum value of the TWT duration that may overlap the TWT duration 424 or 427 of the first external electronic device 313 and the TWT duration 434 or 437 of the second external electronic device 323; when the second external electronic device 323 performs the TWT operation by using a TWT duration less than the minimum value of the TWT duration, the TWT duration 424 or 427 of the first external electronic device 313 and the TWT duration 434 or 437 of the second external electronic device 323 may not overlap each other or the probability of overlapping can be reduced.

The first electronic device 500 may control the communication circuit 510 to transmit the third electronic device 810 a request signal for TWT parameters of an external electronic device connected to the third electronic device 810 (e.g., see FIG. 8B). As the third electronic device 810 may transmit and/or receive data through a channel identical to the channel established between the first electronic device 500 and the first external electronic device (e.g., 313 and/or 321), it can receive a request signal for TWT parameters transmitted by the first electronic device 500.

At operation 822, the second electronic device 600 may determine whether to transmit a response signal.

The second electronic device 600 may calculate (or determine) the maximum value of the TWT interval based on the information for calculating the maximum value of the TWT interval, and may calculate (or determine) the minimum value of the TWT duration based on the information for calculating the minimum value of the TWT duration.

The second electronic device 600 may identify the TWT interval 436 or 439 of the second external electronic device 323, and identify whether the TWT interval 436 or 439 of the second external electronic device 323 is less than the maximum value of the TWT interval. The second electronic device 600 may determine to transmit a response signal based on the TWT interval 436 or 439 of the second external electronic device 323 being less than the maximum value of the TWT interval.

The second electronic device 600 may identify the length of the TWT duration 434 or 437 of the second external electronic device 323, and identify whether the length of the TWT duration 434 or 437 of the second external electronic device 323 is greater than the minimum value of the TWT duration. The second electronic device 600 may determine to transmit a response signal based on the length of the TWT duration 434 or 437 of the second external electronic device 323 being greater than the minimum value of the TWT duration.

Or, the second electronic device 600 may determine to transmit a response signal based on the TWT interval 436 or 439 of the second external electronic device 323 being less than the maximum value of the TWT interval and the length of the TWT duration 434 or 437 of the second external electronic device 323 being greater than the minimum value of the TWT duration.

Or, the second electronic device 600 may identify the TWT parameters of the first external electronic device 313 included in the request signal, and may identify whether the TWT duration of the first external electronic device 313 overlaps the TWT duration of the second external electronic device 323 and/or whether the size of the overlapping section between the TWT duration of the first external electronic device 313 and the TWT duration of the second external electronic device 323 is greater than or equal to (or, greater than) a specified size. The second electronic device 600 may determine to transmit a response signal based on confirming that the size of the overlapping section between the TWT duration of the first external electronic device 313 and the TWT duration of the second external electronic device 323 is greater than or equal to (or, greater than) the specified size.

Or, the second electronic device 600 may determine to transmit a response signal in response to receiving a request signal including an indicator indicating that all electronic devices receiving the request signal should send a response signal.

The response signal may include TWT parameters of the second electronic device 600 and/or the second external electronic device 323. The TWT parameters included in the response signal may include at least one of target wake time 433 indicating the time point of activating data transmission and/or reception, TWT duration (or TWT service period (SP)) 434 or 437 indicating a period in which data transmission and/or reception can be performed, and/or TWT wake interval 436 or 439 indicating the interval between the activation time of data transmission and/or reception and the next activation time of data transmission and/or reception.

At operation 823, the third electronic device 810 may determine whether to transmit a response signal.

The third electronic device 810 may calculate (or determine) the maximum value of the TWT interval based on the information for calculating the maximum value of the TWT interval, and may calculate (or determine) the minimum value of the TWT duration based on the information for calculating the minimum value of the TWT duration.

The third electronic device 810 may identify the TWT interval 436 or 439 of an external electronic device connected, directly or indirectly, to the third electronic device 810, and identify whether the TWT interval 436 or 439 of the external electronic device connected to the third electronic device 810 is less than the maximum value of the TWT interval. The third electronic device 810 may determine to transmit a response signal based on the TWT interval 436 or 439 of the external electronic device connected to the third electronic device 810 being less than the maximum value of the TWT interval.

The third electronic device 810 may identify the length of the TWT duration 434 or 437 of the external electronic device connected to the third electronic device 810, and identify whether the length of the TWT duration 434 or 437 of the external electronic device connected to the third electronic device 810 is greater than the minimum value of the TWT duration. The third electronic device 810 may determine to transmit a response signal based on the length of the TWT duration 434 or 437 of the external electronic device connected to the third electronic device 810 being greater than the minimum value of the TWT duration.

Or, the third electronic device 810 may determine to transmit a response signal based on the TWT interval 436 or 439 of the external electronic device connected, directly or indirectly, to the third electronic device 810 being less than the maximum value of the TWT interval and the length of the TWT duration 434 or 437 of the external electronic device connected to the third electronic device 810 being greater than the minimum value of the TWT duration.

Or, the third electronic device 810 may identify the TWT parameters of the first external electronic device 313 included in the request signal, and may identify whether the TWT duration of the first external electronic device 313 overlaps the TWT duration of the external electronic device connected, directly or indirectly, to the third electronic device 810 and/or whether the size of the overlapping section between the TWT duration of the first external electronic device 313 and the TWT duration of the external electronic device connected to the third electronic device 810 is greater than or equal to (or, greater than) a specified size. The third electronic device 810 may determine to transmit a response signal based on confirming that the size of the overlapping section between the TWT duration of the first external electronic device 313 and the TWT duration of the external electronic device connected to the third electronic device 810 is greater than or equal to (or, greater than) the specified size.

Or, the third electronic device 810 may determine to transmit a response signal in response to receiving a request signal including an indicator indicating that all electronic devices receiving the request signal should send a response signal.

The response signal may include TWT parameters of the third electronic device 810 and/or the external electronic device connected to the third electronic device 810. The TWT parameters included in the response signal may include at least one of target wake time 433 indicating the time point of activating data transmission and/or reception, TWT duration (or TWT service period (SP)) 434 or 437 indicating a period in which data transmission and/or reception can be performed, and/or TWT wake interval 436 or 439 indicating the interval between the activation time of data transmission and/or reception and the next activation time of data transmission and/or reception.

At operation 824, according to determining to transmit a response signal, the second electronic device 600 may transmit a response signal to the first electronic device 500.

At operation 825, according to determining to transmit a response signal, the third electronic device 810 may transmit a response signal to the first electronic device 500.

At operation 826, the first electronic device 500 may configure TWT parameters in response to receiving the response signal transmitted by the second electronic device 600 and the response signal transmitted by the third electronic device 810.

The first electronic device 500 may determine whether to configure (or modify) the TWT parameters of the first external electronic device 313 based on whether the response signal has been received. The situation in which the second electronic device 600 has transmitted the response signal may be or include a situation in which the length of the overlapping section between the TWT duration of the first external electronic device 313 and the TWT duration of the second external electronic device 323 is greater than or equal to (or greater than) the specified size. The situation in which the third electronic device 810 has transmitted the response signal may be or include a situation in which the length of the overlapping section between the TWT duration of the first external electronic device 313 and the TWT duration of the external electronic device connected to the third electronic device 810 is greater than or equal to (or greater than) the specified size.

The first electronic device 500 may configure (or modify) the TWT parameters of the first external electronic device 313 so that the TWT duration 424 or 427 of the first external electronic device 313 does not overlap the TWT duration 434 or 437 of the second external electronic device 323 or the TWT duration of the external electronic device connected to the third electronic device 810, or the length of the overlapping section is less than or equal to (or less than) the specified size.

The first electronic device 500 may change the channel between the first external electronic device 313 and the electronic device 500 in response to determining that it is not possible to configure the TWT parameters so that the TWT duration 424 or 427 of the first external electronic device 313 does not overlap the TWT duration 434 or 437 of the second external electronic device 323 or the TWT duration of the external electronic device connected to the third electronic device 810, or the length of the overlapping section is less than or equal to (or less than) the specified size. The first electronic device 500 may change the channel between the first external electronic device 313 and the first electronic device 500 to a channel with a channel number or of a frequency band different from that of the channel between the second external electronic device 323 and the second electronic device 321 and the channel between the third electronic device 810 and the external electronic device connected to the third electronic device 810.

At operation 827, the first electronic device 500 may transmit a request signal for information related to TWT parameters again to the second electronic device 600 and the third electronic device 810.

The request signal for information related to TWT parameters transmitted at operation 827 may include the TWT parameters of the first external electronic device 313 configured at operation 826.

At operation 828, the second electronic device 600 may determine whether to transmit a response signal in response to reception of the request signal.

The second electronic device 600 may determine not to transmit a response signal in response to confirming that the duration of the first external electronic device 313 and the duration of the second external electronic device 323 do not overlap by more than a specified length.

At operation 829, the third electronic device 810 may determine whether to transmit a response signal in response to reception of the request signal.

The third electronic device 810 may determine not to transmit a response signal in response to confirming that the duration of the first external electronic device 313 and the duration of the external electronic device connected to the third electronic device 810 do not overlap by more than a specified length.

At operation 830, in response to not receiving a response signal within a specified time, the first electronic device 500 may perform a TWT configuration for the first external electronic device 313 by using the TWT parameters configured at operation 826.

As part of the TWT configuration operation for the first external electronic device 313, the first electronic device 500 may transmit the configured TWT parameters to the first external electronic device 313, and may control the first external electronic device 313 to perform a TWT operation according to the configured TWT parameters.

An electronic device (e.g., electronic device 500 in FIG. 5) according to various example embodiments may include: a communication circuit (e.g., communication circuit 510 in FIG. 5) configured to transmit or receive data to or from a first external electronic device connected, directly or indirectly, through short-range wireless communication; and a processor (e.g., processor 520 in FIG. 5) operably connected, directly or indirectly, to the communication circuit 510, wherein the processor 520 may be configured to: receive, from a first external electronic device (e.g., first external electronic device 313 in FIG. 3) connected to the electronic device 500, target wake time (TWT) parameters of the first external electronic device 313; transmit a request signal for information related to TWT parameters of a second external electronic device (e.g., second external electronic device 323 in FIG. 3) belonging to a basic service set (BSS) different from the BSS including the electronic device 500 and the first external electronic device 313; determine whether to configure TWT parameters of the first external electronic device 313 based on whether a response signal corresponding to the signal is received; and configure the TWT parameters of the first external electronic device 313 based on TWT parameters of the second external electronic device 323 included in the response signal.

In the electronic device 500 according to various example embodiments, the processor 520 may be configured to transmit the request signal for information related to TWT parameters including information for the second external electronic device 323 to determine whether to transmit the response signal.

In the electronic device 500 according to various example embodiments, the signal for determining whether to transmit the response signal may include information for calculating the maximum value of the TWT interval and/or information for calculating the minimum value of the TWT duration.

In the electronic device 500 according to various example embodiments, the processor 520 may be configured to determine to configure the TWT parameters of the first external electronic device 313 based on a response signal received from the second external electronic device 323 performing a TWT operation using a TWT interval smaller than the maximum value and/or a TWT duration greater than the minimum value.

In the electronic device 500 according to various example embodiments, the processor 520 may be configured to configure the TWT parameters of the first external electronic device 313 so that the overlapping section between the TWT duration of the second external electronic device 323 and the TWT duration of the first external electronic device 313 is less than or equal to a specified size.

In the electronic device 500 according to various example embodiments, the processor 520 may be configured to change the channel between the electronic device 500 and the first external electronic device 313 in response to determining that it is not possible to change the TWT parameters so that the overlapping section between the TWT duration of the second external electronic device 323 and the TWT duration of the first external electronic device 313 is less than or equal to the specified size.

In the electronic device 500 according to various example embodiments, the channel established between the electronic device 500 and the first external electronic device 313 may be a channel identical to the channel used by the second external electronic device 323.

In the electronic device 500 according to various example embodiments, the processor 520 may be configured to: calculate a channel utilization of the channel established between the electronic device 500 and the first external electronic device 313; and transmit a request signal for information related to TWT parameters of the second external electronic device 323 in response to the channel utilization being greater than or equal to a specified value.

In the electronic device 500 according to various example embodiments, the processor 520 may be configured to transmit a request signal for information related to the TWT parameters of the second external electronic device 323, and the request signal may include TWT parameters of the first external electronic device 313.

An electronic device (e.g., electronic device 600 in FIG. 5) according to various example embodiments may include: a communication circuit (e.g., communication circuit 610 in FIG. 6) configured to transmit or receive data through short-range wireless communication; and a processor (e.g., processor 620 in FIG. 6) operably connected to the communication circuit 610, wherein the processor 620 may be configured to: receive, from a first external electronic device (e.g., first external electronic device 313 in FIG. 3) belonging to a basic service set (BSS) different from the BSS including the electronic device 600, a request signal for information related to target wake time (TWT) parameters of the electronic device 600 and/or a second external electronic device (e.g., second external electronic device 323 in FIG. 3) belonging to the same BSS as the electronic device 600; determine whether to transmit a response signal based on information for determining whether to transmit the response signal included in the request signal; and transmit the response signal to the first external electronic device 313 in response to determining to transmit the response signal.

In the electronic device 600 according to various example embodiments, the information for determining whether to transmit the response signal may include information for calculating the maximum value of the TWT interval and/or information for calculating the minimum value of the TWT duration.

In the electronic device 600 according to various example embodiments, the processor 620 may be configured to: compare the TWT interval of the second external electronic device 323 with the maximum value; compare the TWT duration of the second external electronic device 323 with the minimum value; and determine whether to transmit the response signal based on the comparison results.

In the electronic device 600 according to various example embodiments, the processor 620 may be configured to determine to transmit the response signal in response to confirming that the TWT interval of the second external electronic device 323 is less than the maximum value and/or the TWT duration of the second external electronic device 323 is greater than the minimum value.

In the electronic device 600 according to various example embodiments, the processor 620 may be configured to: identify, based on the request signal, TWT parameters of the first external electronic device 313 and/or another external electronic device (e.g., first electronic device 311 in FIG. 3) belonging to the same BSS as that of the first external electronic device 313; and configure the TWT parameters of the second external electronic device 323 based on the TWT parameters of the other external electronic device (e.g., 311 and/or 313).

FIG. 9 is a flowchart illustrating an operation method 900 of an electronic device according to various example embodiments.

At operation 910, the electronic device (e.g., electronic device 500 in FIG. 5) may receive TWT parameters of a first external electronic device (e.g., first external electronic device 313 in FIG. 3).

The electronic device 500 may receive TWT parameters of the first external electronic device 313 during a TWT negotiation procedure performed with the first external electronic device 313.

At operation 920, the electronic device 500 may transmit a request signal for information related to TWT parameters of a second external electronic device (e.g., second external electronic device 323 in FIG. 3) belonging to a BSS (e.g., second BSS 320 in FIG. 3) different from the BSS (e.g., first BSS 310 in FIG. 3) including the electronic device 500 and the first external electronic device 313.

While transmitting or receiving data to or from the first external electronic device, the electronic device 500 may sense that another external electronic device (e.g., second electronic device 321 in FIG. 3 and/or second external electronic device 600) transmits and/or receives data over a channel identical to the channel generated between the first external electronic device 313 and the electronic device 500.

According to an embodiment, the electronic device 500 may parse data received through the channel identical to the channel generated between the first external electronic device 313 and the electronic device 500, and may identify that the received data has been transmitted by a different external electronic device 321 or 323 other than the first external electronic device 313. The electronic device 500 may determine whether the channel generated between the first external electronic device 313 and the electronic device 500 satisfies a specified condition, and may perform a series of operations to obtain TWT parameters of the entities (e.g., second electronic device 600 and/or second external electronic device 323) belonging to a BSS (e.g., second BSS 320 in FIG. 3) different from the BSS (e.g., first BSS 310 in FIG. 3) including the electronic device 500 and the first external electronic device 313 in response to the channel satisfying the specified condition.

The TWT parameter request signal may include information for determining whether to transmit a response signal in correspondence to the TWT parameter request signal and/or TWT parameters of the first external electronic device (e.g., 313 and/or 321).

The TWT parameters of the first external electronic device (e.g., 313 and/or 321) may include at least one of target wake time (e.g., 411 in FIG. 4A, 423 in FIG. 4B) indicating the time point of activating data transmission and/or reception, TWT duration (e.g., 412-*a*, 412-*b* or 412-*c* in FIG. 4A, 424 or 427 in FIG. 4B) indicating a period in which data transmission and/or reception can be performed, and/or TWT wake interval (e.g., 413-a or 413-b in FIG. 4A, 426 or 429 in FIG. 4B) indicating the interval between the activation time of data transmission and/or reception and the next activation time of data transmission and/or reception.

The information for determining whether to transmit a response signal may be information for the second electronic device 600 to compare it with the TWT parameters of the second external electronic device 323. The information for determining whether to transmit a response signal may include information for calculating the maximum value of the TWT interval (e.g., TWT wake interval exponent, maximum TWT wake interval mantissa) and/or information for calculating the minimum value of the TWT duration (e.g., wake duration unit, minimum nominal TWT wake duration).

The second electronic device 600 may calculate (or determine) the maximum value of the TWT interval based on the information for calculating the maximum value of the TWT interval, and may calculate (or determine) the minimum value of the TWT duration based on the information for calculating the minimum value of the TWT duration.

The second electronic device 600 may identify the TWT interval 436 or 439 of the second external electronic device 323, and identify whether the TWT interval 436 or 439 of the second external electronic device 323 is less than the maximum value of the TWT interval. The second electronic device 600 may determine to transmit a response signal based on the TWT interval 436 or 439 of the second external electronic device 323 being less than the maximum value of the TWT interval.

The second electronic device 600 may identify the length of the TWT duration 434 or 437 of the second external electronic device 323, and identify whether the length of the TWT duration 434 or 437 of the second external electronic device 323 is greater than the minimum value of the TWT duration. The second electronic device 600 may determine to transmit a response signal based on the length of the TWT duration 434 or 437 of the second external electronic device 323 being greater than the minimum value of the TWT duration.

Or, the second electronic device 600 may determine to transmit a response signal based on the TWT interval 436 or 439 of the second external electronic device 323 being less than the maximum value of the TWT interval and the length of the TWT duration 434 or 437 of the second external electronic device 323 being greater than the minimum value of the TWT duration.

Or, the second electronic device 600 may identify the TWT parameters of the first external electronic device 313 included in the request signal, and may identify whether the TWT duration of the first external electronic device 313 overlaps the TWT duration of the second external electronic device 323 and/or whether the size of the overlapping section between the TWT duration of the first external electronic device 313 and the TWT duration of the second external electronic device 323 is greater than or equal to (or, greater than) a specified size. The second electronic device 600 may determine to transmit a response signal based on confirming that the size of the overlapping section between the TWT duration of the first external electronic device 313 and the TWT duration of the second external electronic device 323 is greater than or equal to (or, greater than) the specified size.

Or, the second electronic device 600 may determine to transmit a response signal in response to receiving a request signal including an indicator indicating that all electronic devices receiving the request signal should send a response signal.

At operation 930, the electronic device 500 may determine whether to configure TWT parameters based on whether a response signal is received.

The response signal may include TWT parameters of the second electronic device 600 and/or the second external electronic device 323. The TWT parameters included in the response signal may include at least one of target wake time 433 indicating the time point of activating data transmission and/or reception, TWT duration (or TWT service period (SP)) 434 or 437 indicating a period in which data transmission and/or reception can be performed, and/or TWT wake interval 436 or 439 indicating the interval between the activation time of data transmission and/or reception and the next activation time of data transmission and/or reception.

The electronic device 500 may determine whether to configure (or modify) the TWT parameters of the first external electronic device 313 based on whether the response signal has been received. The situation in which the second electronic device 600 has transmitted the response signal may include a situation in which the length of the overlapping section between the TWT duration of the first external electronic device 313 and the TWT duration of the second external electronic device 323 is greater than or equal to (or greater than) the specified size, or a situation in which the reply all field (e.g., 722 in FIG. 7B) indicating the condition of an electronic device to transmit a response signal corresponding to the request signal includes information indicating transmission of a response signal. "Based on" herein covers based at least on.

At operation 940, the electronic device 500 may configure the TWT parameters of the first external electronic device 313 based on the TWT parameters of the second external electronic device 323 included in the response signal.

The electronic device 500 may configure (or modify) the TWT parameters of the first external electronic device 313 so that the TWT duration 424 or 427 of the first external electronic device 313 does not overlap the TWT duration 434 or 437 of the second external electronic device 323 or the length of the overlapping section is less than or equal to (or less than) the specified size.

The electronic device 500 may change the channel between the first external electronic device 313 and the electronic device 500 in response to determining that it is not possible to configure the TWT parameters so that the TWT duration 424 or 427 of the first external electronic device 313 does not overlap the TWT duration 434 or 437 of the second external electronic device 323 or the length of the overlapping section is less than or equal to (or less than) the specified size. The electronic device 500 may change the channel between the first external electronic device 313 and the electronic device 500 to a channel with a channel number or of a frequency band different from that of the channel between the second external electronic device 323 and the second electronic device 321.

An operation method of an electronic device (e.g., electronic device 500 in FIG. 5) according to various example embodiments may include: receiving, from a first external electronic device (e.g., first external electronic device 313 in FIG. 3) connected to the electronic device 500, target wake time (TWT) parameters of the first external electronic device 313; transmitting a request signal for information related to TWT parameters of a second external electronic device (e.g., second external electronic device 323 in FIG. 3) belonging to a basic service set (BSS) different from the BSS including the electronic device 500 and the first external electronic device 313; determining whether to configure TWT parameters of the first external electronic device 313 based on whether a response signal corresponding to the request signal is received; and configuring the TWT parameters of the first external electronic device 313 based on TWT parameters of the second external electronic device 323 included in the response signal.

In the operation method of the electronic device 500 according to various example embodiments, transmitting a request signal for information related to TWT parameters may include transmitting the request signal for information related to TWT parameters including information for the second external electronic device 323 to determine whether to transmit the response signal.

In the operation method of the electronic device 500 according to various example embodiments, the signal for determining whether to transmit the response signal may include information for calculating the maximum value of the TWT interval and/or information for calculating the minimum value of the TWT duration.

In the operation method of the electronic device 500 according to various example embodiments, configuring the TWT parameters of the first external electronic device 313 may include determining to change the TWT parameters of the first external electronic device 313 based on a response signal received from the second external electronic device 323 performing a TWT operation using a TWT interval smaller than the maximum value and/or a TWT duration greater than the minimum value.

In the operation method of the electronic device 500 according to various example embodiments, configuring the TWT parameters of the first external electronic device 313 may include configuring the TWT parameters of the first external electronic device 313 so that the overlapping section between the TWT duration of the second external electronic device 323 and the TWT duration of the first external electronic device 313 is less than or equal to a specified size.

The operation method of the electronic device 500 according to various example embodiments may further include changing the channel between the electronic device 500 and the first external electronic device 313 in response to determining that it is not possible to change the TWT parameters of the first external electronic device 313 so that the overlapping section between the TWT duration of the second external electronic device 323 and the TWT duration of the first external electronic device 313 is less than or equal to the specified size.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via at least a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium 134 (e.g., internal memory 136 and/or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An electronic device comprising:

a communication circuit configured to transmit and/or receive data to and/or from a first external electronic device connected through short-range wireless communication; and at least one processor, comprising processing circuitry, operably connected to the communication circuit, wherein the at least one processor is configured, individually and/or collectively, to:

receive, from the first external electronic device connected to the electronic device, target wake time (TWT) parameters of the first external electronic device;

identify a channel utilization of a channel established between the electronic device and the first external electronic device while performing the short-range wireless communication with the first external electronic device; and based on the identification that the channel utilization is greater than or equal to a specified value, control the communication circuit to transmit, to a second external electronic device, a request signal for information related to TWT parameters of the second external electronic device, wherein the second external electronic device belongs to a basic service set (BSS) different from a BSS including the electronic device and the first external electronic device;

receive, from the second external electronic device, a response signal including TWT parameters of the second external electronic device; and configure TWT duration included in TWT parameters of the first external electronic device based on the TWT parameters of the second external electronic device.

2. The electronic device of claim 1, wherein the at least one processor is configured individually and/or collectively to control the communication circuit to transmit the request signal for information related to TWT parameters including information for the second external electronic device to determine whether to transmit the response signal.

3. The electronic device of claim 2, wherein a signal for determining whether to transmit the response signal includes information for calculating a maximum value of a TWT interval and/or information for calculating a minimum value of a TWT duration.

4. The electronic device of claim 3, wherein the at least one processor is configured individually and/or collectively to determine to configure the TWT parameters of the first external electronic device based on a response signal received from the second external electronic device performing a TWT operation using a TWT interval smaller than the maximum value and/or a TWT duration greater than the minimum value.

5. The electronic device of claim 1, wherein the configured TWT parameters of the first external electronic device enables a length of a duration in which a TWT duration of the first external electronic device and a TWT duration of the second external electronic device is overlapped to be less than a specified value.

6. The electronic device of claim 1, wherein the at least one processor is configured individually and/or collectively to change a channel between the electronic device and the first external electronic device in response to determining that changing TWT parameters of the first external electronic device is not enabled.

7. The electronic device of claim 1, wherein a frequency band of a channel established between the electronic device and the first external electronic device is identical to a frequency band of a channel used by the second external electronic device.

8. The electronic device of claim 1, wherein:

the at least one processor is configured individually and/or collectively to control the communication circuit to transmit a request signal for information related to TWT parameters of the second external electronic device; and the request signal includes the TWT parameters of the first external electronic device.

9. An operation method of an electronic device, the method comprising:

receiving, from a first external electronic device connected to the electronic device, target wake time (TWT) parameters of the first external electronic device;

identifying a channel utilization of a channel established between the electronic device and the first external electronic device while performing the short-range wireless communication with the first external electronic device;

based on identification that the channel utilization is greater than or equal to a specified value, transmitting a request signal for information related to TWT parameters of a second external electronic device, wherein the second external electronic device belongs to a basic service set (BSS) different from a BSS including the electronic device and the first external electronic device;

receiving, from the second external electronic device, a response signal including TWT parameters of the second external electronic device; and configuring TWT duration included in TWT parameters of the first external electronic device based on the TWT parameters of the second external electronic device.

10. The operation method of claim 9, wherein transmitting a request signal for information related to TWT parameters comprises transmitting the request signal for information related to TWT parameters including information for the second external electronic device to determine whether to transmit the response signal.

11. The operation method of claim 10, wherein a signal for determining whether to transmit the response signal includes information for calculating a maximum value of a TWT interval and/or information for calculating a minimum value of a TWT duration.

12. The operation method of claim 11, wherein configuring the TWT duration of the first external electronic device comprises determining to change the TWT parameters of the first external electronic device based on a response signal received from the second external electronic device performing a TWT operation using a TWT interval smaller than the maximum value and/or a TWT duration greater than the minimum value.

13. The operation method of claim 9, wherein configuring the TWT duration of the first external electronic device comprises configuring the TWT parameters of the first external electronic device so that an overlapping section between a TWT duration of the second external electronic device and a TWT duration of the first external electronic device is less than or equal to a specified size.

14. The operation method of claim 9, further comprising changing a channel between the electronic device and the first external electronic device in response to determining that it is not possible to change the TWT parameters of the first external electronic device so that the overlapping section between a TWT duration of the second external electronic device and a TWT duration of the first external electronic device is less than or equal to the specified size.

\* \* \* \* \*